United States Patent
Lindskog et al.

(10) Patent No.: US 12,395,358 B2
(45) Date of Patent: Aug. 19, 2025

(54) SECURITY COMPONENT HAVING PHYSICALLY UNCLONABLE FUNCTION (PUF) AND METHOD OF OPERATION

(71) Applicant: Telefonaktiebolaget LM Ericsson (publ), Stockholm (SE)

(72) Inventors: Niklas Lindskog, Lund (SE); Håkan Englund, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 272 days.

(21) Appl. No.: 18/012,911

(22) PCT Filed: Jun. 26, 2020

(86) PCT No.: PCT/EP2020/068140
§ 371 (c)(1),
(2) Date: Dec. 23, 2022

(87) PCT Pub. No.: WO2021/259500
PCT Pub. Date: Dec. 30, 2021

(65) Prior Publication Data
US 2023/0261884 A1    Aug. 17, 2023

(51) Int. Cl.
*H04L 9/32* (2006.01)
*G06F 21/57* (2013.01)
*H04L 9/08* (2006.01)

(52) U.S. Cl.
CPC .......... *H04L 9/3278* (2013.01); *G06F 21/575* (2013.01); *H04L 9/0866* (2013.01); *H04L 9/0877* (2013.01); *H04L 2209/12* (2013.01)

(58) Field of Classification Search
CPC ... H04L 9/3278; H04L 9/0866; H04L 9/0877; H04L 2209/12; H04L 9/32; G06F 21/575
See application file for complete search history.

(56) References Cited

U.S. PATENT DOCUMENTS 8,928,347 B2   1/2015 Gotze et al.
9,032,476 B2 * 5/2015 Potkonjak ............. H04L 9/3278
                                                    726/2

(Continued)

FOREIGN PATENT DOCUMENTS

CN    109614790 A    9/2021
EP      2615571 A1   7/2013
EP      3562092 A1  10/2019

OTHER PUBLICATIONS

Haj-Yahya et al., "Lightweight Secure-Boot Architecture for RISC-V System-on-Chip", 20th International Symposium on Quality Electronic Design (ISQED), IEEE Mar. 6, 2019, p. 216-223.

(Continued)

*Primary Examiner* — Quazi Farooqui
(74) *Attorney, Agent, or Firm* — Sage Patent Group

(57) ABSTRACT

A security component (102, 202) for a device (200) is disclosed. The security component comprises a Physically Unclonable Function (PUF) (150) that is operable to accept a plurality of challenges and to generate a corresponding plurality of responses. The security component further comprises control logic (110) configured to generate a challenge for submission to the PUF on the basis of at least one of measurements of components booted on the device or a measurement of a hardware state of the device. The PUF comprises a plurality of sub functions (152), and the challenge determines how the sub functions are used by the PUF to generate a PUF response. Also disclosed is a method (300) for operating a security component.

19 Claims, 15 Drawing Sheets

(56) References Cited

U.S. PATENT DOCUMENTS

| | | |
|---|---|---|
| 10,263,793 B2 | 4/2019 | Rezayee et al. |
| 2003/0204743 A1 | 10/2003 | Devadas et al. |
| 2008/0231418 A1 | 9/2008 | Ophey et al. |
| 2011/0055851 A1 | 3/2011 | Potkonjak et al. |
| 2019/0044739 A1 | 2/2019 | Sachdev et al. |
| 2020/0084052 A1* | 3/2020 | O'Connell .............. G11C 7/24 |
| 2021/0243042 A1* | 8/2021 | Ahn ..................... H04L 9/3278 |

OTHER PUBLICATIONS

Huang et al., "Lightweight Hardware Based Secure Authentication Scheme for Fog Computing", 2018 IEEE/ACM symposium on Edge Computing (SEC), IEEE, Oct. 25, 2018, pp. 443-439.

* cited by examiner

SECURITY COMPONENT HAVING PHYSICALLY UNCLONABLE FUNCTION (PUF) AND METHOD OF OPERATION

PRIORITY CLAIM

This application is a national stage application of International Patent Application No. PCT/EP2020/068140, filed Jun. 26, 2020, the disclosure disclosures of which is hereby incorporated in its entirety by reference.

TECHNICAL FIELD

The present disclosure relates to a security component for a device and to a method for operating a security component for a device. The present disclosure also relates to a computer program and a computer program product configured, when run on a computer to carry out methods for operating a security component for a device.

BACKGROUND

Physically Unclonable Functions (PUFs) may be used as part of a security apparatus for an electronic device, which may for example be a device operable to communicate over wired or wireless technology, and may be operable to connect to a communication network. PUFs are used to create a unique response by exploiting implicit or explicit randomness in their physical structure. Implicit randomness refers to unpredictable manufacturing differences in semiconductor devices, which differences can be exploited to create a device-unique response. Explicit randomness refers to differences that are not an inherent consequence of manufacturing but are deliberately introduced at a later stage. A PUF response can be used for cryptographic or device identity purposes. For example, a PUF response may be used to create a unique device identity or a device unique key, without having to store the key in, for example, Battery Backed Random Access Memory (BBRAM) or One Time Pad (OTP) memory.

A PUF may consist of one or several elements or components, referred to in the present disclosure as sub functions. Each sub function contributes a part of the PUF response. Examples of sub functions may include:

Ring-oscillators: an uneven number of signal inverters in a ring which uses gate delay propagation as a source of randomness. The PUF response is a comparison between two or more ring-oscillators where the number of oscillations at a given point is measured. The response can e.g. be the identifier of the fastest/slowest ring oscillator.

Uninitialized Static Random Access Memory (SRAM) cells, which have two possible states (0 and 1). Prior to power up, the cell is in neither state. At power up, the cell stabilizes in one of the two states. The response is the entered state.

Each sub function also has the property that it is physically unclonable, i.e. unique for the device. A PUF may therefore comprise several sub functions which can be used as independent PUFs, albeit with fewer possible challenges and fewer response bits.

Many different types of PUF exist, and the different types may be categorized according to performance, physical structure etc. Challenge-response type PUFs require input to trigger the PUF response. Challenge-response types PUFs include static PUFs, which support only a single challenge to which they return a response, and PUFs supporting multiple challenge-response mappings. Most PUF types additionally require user data in order to function properly; for example a PUF may need helper data in order to increase the probability of recreating exactly the same response given the same challenge. As a PUF response is usually sensitive and should be kept secret, devices incorporating a PUF are usually required to have firmware and/or hardware protecting the PUF.

In general, the possibility to configure a PUF on a device is limited. U.S. Pat. No. 10,263,793 discloses the possibility of modifying a PUF response as a consequence of a "tamper event". This may temporarily disable the PUF in order to prevent the PUF from providing its response, and so disclosing associated keys or identity, while the tamper event is investigated. In other examples, the modification may be a permanent change, essentially destroying the PUF as installed by permanently modifying its structure, and consequently its response to a challenge.

SUMMARY

It is an aim of the present disclosure to provide a security component, method of operating a security component, and a computer readable medium which cooperate to provide a security component response which is dependent upon components booted on the device.

According to a first aspect of the present disclosure, there is provided a security component for a device. The security component comprises a Physically Unclonable Function (PUF) that is operable to accept a plurality of challenges and to generate a corresponding plurality of responses, and control logic configured to generate a challenge for submission to the PUF on the basis of at least one of measurements of components booted on the device, or a measurement of a hardware state of the device. The PUF comprises a plurality of sub functions, and the challenge determines how the subfunctions are used to generate a PUF response. Determining how the sub functions are used to generate a PUF response may comprise determine which sub functions are used by the PUF to generate the PUF response and/or how the sub functions are configured to generate the PUF response.

According to another aspect of the present disclosure, there is provided a method for operating a security component for a device, the security component comprising a PUF that is operable to accept a plurality of challenges and to generate a corresponding plurality of responses and control logic configured to generate a challenge for submission to the PUF. The method comprises receiving, from a device boot process, at least one of a measurement of a component booted on the device, or a measurement of the hardware state, and using the control logic to generate a challenge for submission to the PUF on the basis of the received measurement. The method further comprises generating a PUF response on the basis of the generated challenge, and generating a security component output on the basis of the PUF response.

According to another aspect of the present disclosure, there is provided a computer program product comprising a computer readable medium, the computer readable medium having computer readable code embodied therein, the computer readable code being configured such that, on execution by a suitable computer or processor, the computer or processor is caused to perform a method according to any of the aspects or examples of the present disclosure.

Aspects of the present disclosure thus provide a security component comprising a PUF which is, in effect "aware" of the environment in which it is running. Challenge-response types of PUF can deterministically generate multiple responses. According to the prior art, PUF implementations either use a fixed challenge to generate a single response, or make all challenges available for every setup of the device, such that anyone with access to the PUF has the possibility to generate any challenge-response pair. Aspects of the present disclosure associate a given challenge to a setup of the device the PUF is present on, that is to components booted on the device or a hardware state of the device indicated by a measurement, so allowing, for example, each device setup to have its own unique challenge-response pair, and consequently unique key, if the security component is used for encryption.

BRIEF DESCRIPTION OF THE DRAWINGS

For a better understanding of the present disclosure, and to show more clearly how it may be carried into effect, reference will now be made, by way of example, to the following drawings in which.

DETAILED DESCRIPTION

Examples of the present disclosure provide a security component for a device comprising a challenge-response type PUF and control logic. The control logic has the effect of causing the challenge submitted to the PUF to be determined by the current setup of the device, that is by measurements of components booted on the device, and/or a measurement of a hardware state of the device, including temperature, tamper detection, etc. In this manner, a specific challenge, and consequently a specific response, may be generated for each particular device set-up, wherein a device set-up comprises a combination of components booted on the device and/or measurements of the device hardware state. The set-up specific responses generated by the PUF allow for the generation of device identities and/or device specific keys that are accessible only for certain setups of the device, allowing for different identities or keys for device manufacturers, owners etc., and/or for devices booted in different modes (e.g. safe mode or operational mode etc.). In some examples of the present disclosure, every measurement may be combined with all previous measurements, making each challenge not only unique for a set of components and/or hardware state but also for the order in which the components are booted and/or the hardware state measurements are received.

Different modes of operation of the security component are envisaged. According to a first, or "input-only" mode, the control logic may generate the same challenge, such that the PUF generates the same response, for a plurality of requests provided no new measurements have been supplied. According to a second, or "loopback" mode, a PUF response may be treated as a new measurement, such that the control logic generates a different challenge, and the PUF generates a different response, each time a request for a response from the security component is granted.

Figure 1:
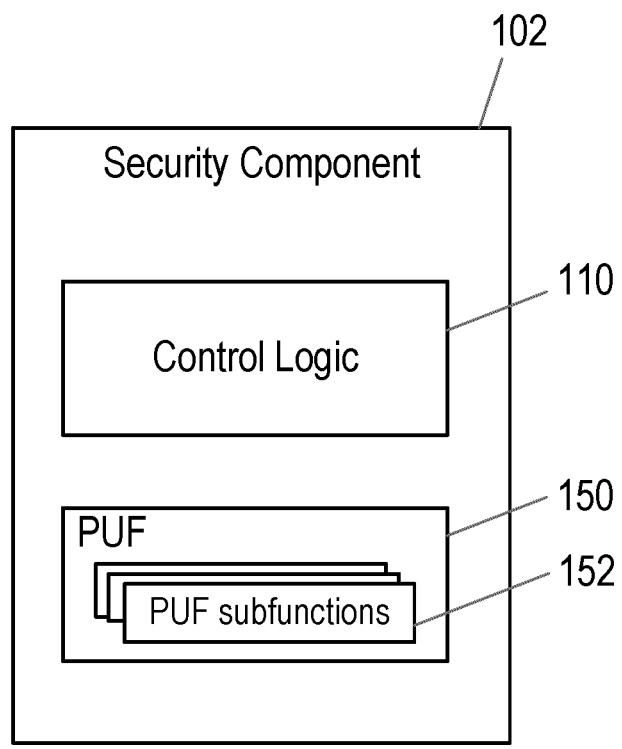
FIG. 1 is a block diagram illustrating a first example of a security component for a device.

FIG. 1 is a block diagram illustrating a first example of a security component 102 for a device according to the present disclosure. The device may comprise an electronic device, which may for example be device operable to communicate over wired or wireless technology, and may be operable to connect to a communication network. The device may for example comprise a UE. Referring to FIG. 1, the security component 102 comprises a Physically Unclonable Function (PUF) 150 that is operable to accept a plurality of challenges and to generate a corresponding plurality of responses. The security component further comprises control logic configured to generate a challenge for submission to the PUF on the basis at least one of measurements of components booted on the device or a measurement of a hardware state of the device. As illustrated in FIG. 1, the PUF comprises a plurality of sub functions 152, and the challenge determines how the sub functions are used by the PUF to generate a PUF response. Determining how the sub functions are used to generate a PUF response may comprise determine which sub functions are used by the PUF to generate the PUF response and/or how the sub functions are configured to generate the PUF response. The PUF may comprise a logically reconfigurable PUF (LR-PUF), and may be operable to accept a significant number of challenges. The PUF may for example be large enough to have a search space that is too large to store or loop though.

Depending on the use case, this may comprise a PUF having a minimum response of between 30 and 100 bits, corresponding to a search space of between 2^30 and 2^100. The minimum search space may be associated with the presence and duration of a time limit between attempts to obtain a PUF response. For example if a time limit exists between attempts to obtain a PUF response, the minimum size of search space may be defined such that the total accumulated time to attempt all challenges is longer than the time limit between attempts by a significant margin. The total accumulated time to attempt all challenges should for example be no less than several years, and may in some examples be no less than several decades.

For the purposes of the present disclosure, a PUF sub function comprises a component of the PUF that generates a part, for example one or more bits, of the PUF response. A PUF sub function may therefore be referred to as a PUF element or PUF component, and may be embodied by a pair of ring oscillators, an SRAM memory cell, an arbiter, transistor components, etc. In some examples, the challenge generated by the control logic may also determine, in addition to which sub functions are used by the PUF to generate a PUF response and/or how the sub functions are configured, in what order the sub functions are used to generate the PUF response.

The components booted on the device may be software components or bitstreams, and measurements of such components may comprise a function of the component booted, for example a cryptographic function of the component such as a hash function. Measurements of a hardware state of the device may comprise a function of the hardware state, for example a cryptographic function of the state registers of a hardware component, or a cryptographic function of a device sensor measurement, such as a hash function.

Figure 2:
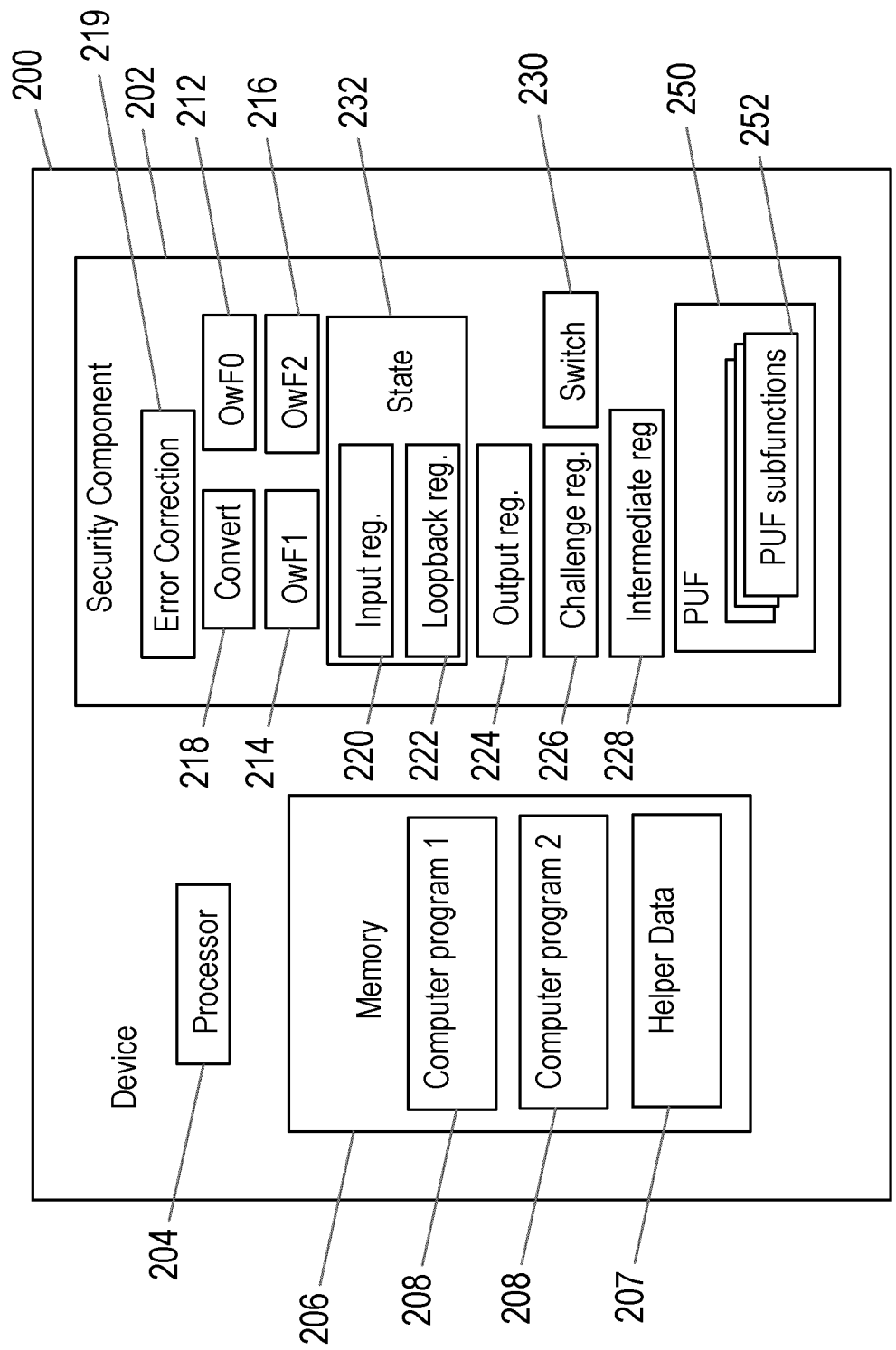
FIG. 2 is a block diagram illustrating another example of security component and a device on which the security component is installed.

FIG. 2 is a block diagram illustrating another example of security component 202, and a device 200 on which the security component is installed. The security component 202 of FIG. 2 illustrates various options for how the control logic 110 of the security component 102 may be realised. It will be appreciated that, as discussed in further detail below, not all of the control logic elements illustrated in FIG. 2 may be present in each realisation of control logic according to FIG. 2.

Referring to FIG. 2, the device 200 on which the security component 202 is installed comprises a processor 204 and memory 206, on which one or more computer programs 208 may be stored. Items of "Helper Data" 207, including for example error correcting codes, may also be stored in the memory 206, according to different examples of the present disclosure. The device 200 may additionally comprise one or more telecommunications interfaces, for wired or wireless communication. The security component 202 comprises a PUF 250 that is operable to accept a plurality of challenges and to generate a corresponding plurality of responses. The PUF comprises a plurality of sub functions 252. The security component further comprises control logic configured to generate a challenge for submission to the PUF 250 on the basis of at least one of measurements of components booted on the device 200 or a measurement of a hardware state of the device 200. The challenge determines how the sub functions 252 are used by the PUF 250 to generate a PUF response, including which sub functions to use, how to configure sub functions and/or in what order to use sub functions. As discussed above with reference to FIG. 1, the PUF may comprise a logically reconfigurable PUF (LR-PUF), and may be operable to accept a significant number of challenges.

According to examples of the security component 202, the control logic comprises an input register 220 that is configured to be written with data based on at least a measurement of a component booted on the device 200, or measurement of the hardware state of the device 200. The control logic further comprises a challenge one way function, illustrated as OwF1 214, that is configured to generate a challenge for submission to the PUF based on a current value of the input register 220. The control logic may further comprise a loopback register configured to be written with data based on a current response generated by the PUF, and the challenge one way function 214 may in some examples be configured to generate a challenge for submission to the PUF based a current value of the input register and a current value of the loopback register. The control logic may further comprise a switch 230 configured to control whether or not data based on a current response generated by the PUF is written to the loopback register.

It may be the case that not all outputs of the challenge one way function 214 are valid challenges for the PUF 250. Thus, in some examples of the security component 202, the control logic may further comprise conversion logic 218 for converting an output of the challenge one way function 214, which output is not a valid challenge for the PUF 250, into a valid challenge for the PUF 250. The conversion logic may comprise at least one of a feedback loop configured to input the output of the challenge one way function 214 to the challenge one way function 214 until a valid challenge for the PUF 250 is obtained, a translation module for translating the output of the challenge one way function into a valid challenge for the PUF, or a correction module for correcting the output of the challenge one way function into a valid challenge for the PUF. The translation module may comprise a look up table for mapping from an output that is not a valid challenge to a valid challenge, and the correction module may use error correction or fuzzy extraction techniques.

It may be the case that the response generated by the PUF 250 may not be stable between generations, owing for example to variations in temperature, hardware degradation etc. The response generated to a particular challenge may thus vary over time, such that a response generated to a particular challenge after several generations may contain errors compared with the response generated the first time that challenge was submitted. According to some examples of the present disclosure, the output of the PUF 250 may therefore be subject to error correction to correct for such output variations. In some examples of the security component 202, the control logic may further comprise an error correction module 219 that is configured to correct for errors in a response generated by the PUF. The error correction module 219 may comprise one or more error correcting functions, and may be configured to extract and save in the memory 206 of the device 200 helper data 207 from a first generated response to a challenge, and to use the helper data 207 to perform error correction on subsequently generated responses to the challenge. The error correction may correct for errors in the response owing to variations such as temperature variations and/or hardware degradation.

According to some examples of the present disclosure, the security component 202 may be configured to chain measurements of booted components, which chaining may be achieved via an input one way function, illustrated as OwF0 212. The input one way function 212 may be configured to generate an input for writing to the input register 220 based on a current measurement of a component on the device and on a current value of the input register 220.

According to further examples of the present disclosure, component provided data may also be used as input to the challenge, via being written to the input register 220. Thus the input register may be further configured to be written with data provided by a component booted on the device. The input register may be configured to be written either with user provided data or with measurement data.

Referring still to FIG. 2, the control logic of the security component 202 further comprises an output one way function, illustrated as OwF2 216, that is configured to generate a security component output based on a response generated by the PUF 250. The output one way function 216 may be configured to generate the security component output based on an error corrected PUF response, if an error correction module 219 is present. The control logic may further comprise an output register 224 configured to be written with the security component output. In some examples, the loopback register 222 may be written with the security component output generated by the output one way function 216.

According to some examples of the present disclosure, the output of the security component 202 may be made dependent on one or more component identifiers of components requesting a PUF response. Thus the output one way function 216 may be further configured to generate the security component output based on both the response generated by the PUF and an identifier of a component requesting a response from the PUF. In such examples, the control logic may further comprise an intermediate register 228 configured to be written with a response of the PUF 250, which may be an error corrected response, if the error correction module 219 is present. The output one way function 216 may be configured to generate the security component output based on both a current value of the intermediate register 228 and an identifier of a component requesting a response from the PUF. The component may be a hardware component or a software component.

The loopback register 222, which is configured to be written with data based on a current response generated by the PUF 250, may be written with the contents of the output register 224 or, if an intermediate register 228 is present, with the contents of the intermediate register 228. In this manner, the loopback register contents may remain independent of an identifier of a component requesting a response from the PUF, and based only on the PUF response.

The control logic of the security components 102, 202 may be arranged in a variety of different ways, in order to achieve chaining of measurement values, a PUF response based on component input data, a PUF response that is specific both to component measurements and a component requesting the PUF response, etc. Examples of security component configurations achieving a range of different functionality are presented below, with reference to FIGS. 5 to 12.

Figure 3:
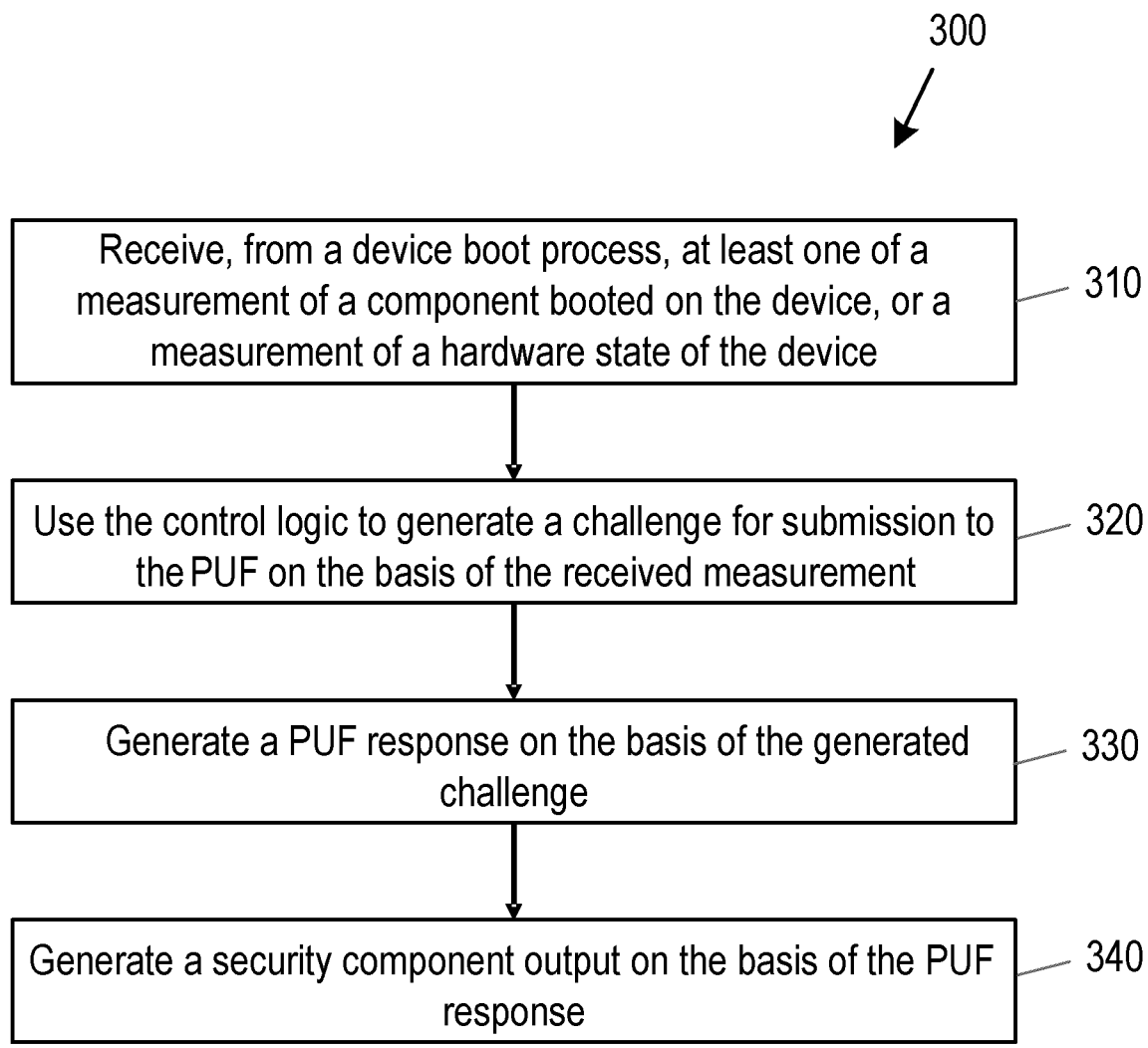
FIG. 3 is a flow chart illustrating a method for operating a security component for a device.

FIG. 3 is a flow chart illustrating a method 300 for operating a security component for a device. The security component comprises a PUF that is operable to accept a plurality of challenges and to generate a corresponding plurality of responses, and control logic configured to generate a challenge for submission to the PUF. The security component may for example comprise a security component 102 or 202 as described above. Referring to FIG. 3, the method comprises, in a first step 310, receiving, from a device boot process, at least one of a measurement of a component booted on the device or a measurement of a hardware state of the device. The method then comprises, in step 320, using the control logic to generate a challenge for submission to the PUF on the basis of the received measurement. The method then comprises, in step 330, generating a PUF response on the basis of the generated challenge, and, in step 340, generating a security component output on the basis of the PUF response.

Figure 4:
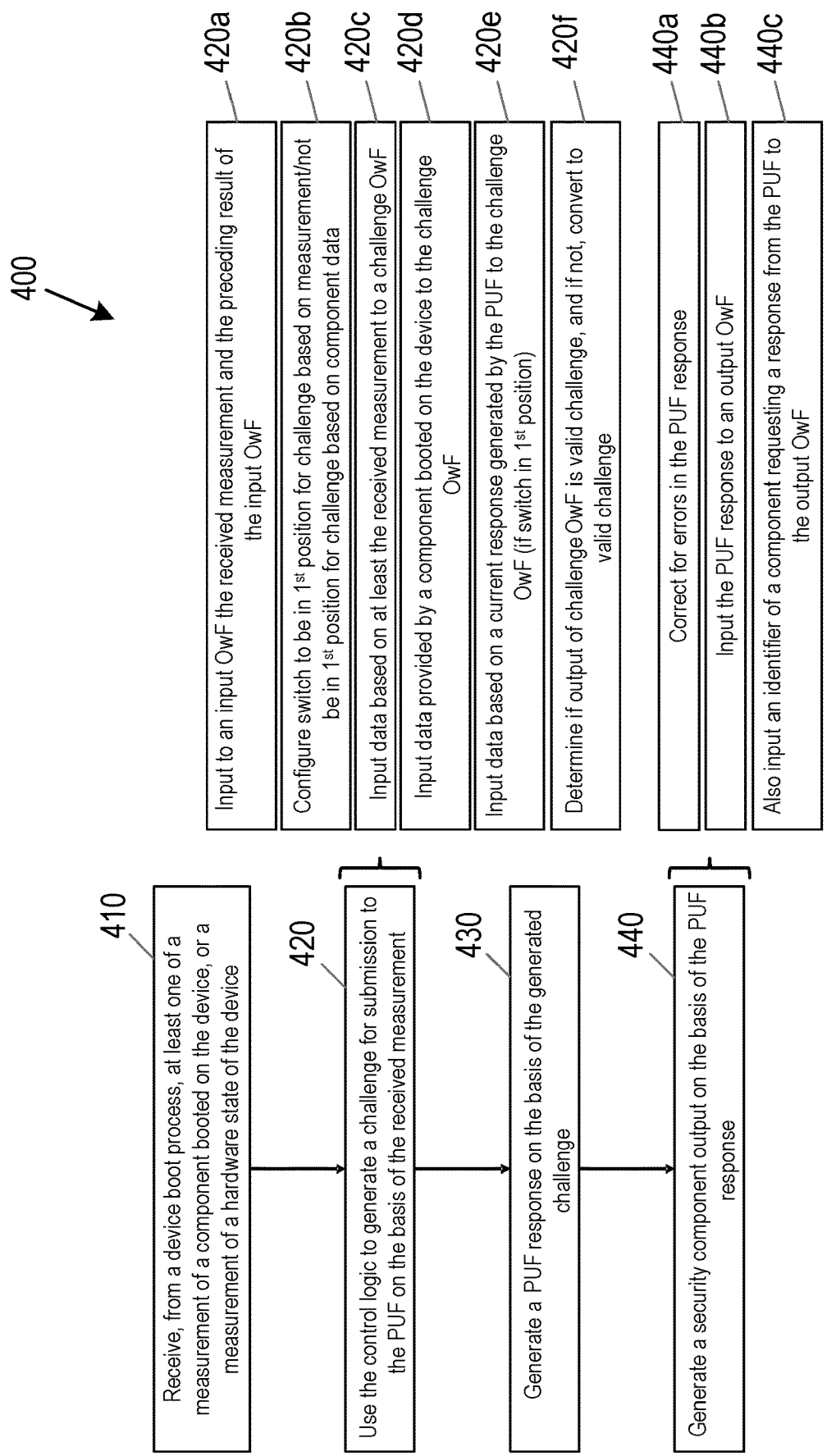
FIG. 4 is a flow chart illustrating another example of method for operating a security component for a device.

FIG. 4 is a flow chart illustrating process steps in another example of method 400 for operating a security component for a device. As for the method 300, the security component comprises a PUF that is operable to accept a plurality of challenges and to generate a corresponding plurality of responses, and control logic configured to generate a challenge for submission to the PUF. The security component may for example comprise a security component 102 or 202 as described above. The method 400 illustrates examples of how the steps of the method 300 may be implemented and supplemented to achieve the above discussed and additional functionality.

Referring to FIG. 4, in a first step 410, the method 400 comprises receiving, from a device boot process, at least one of a measurement of a component booted on the device or a measurement of a hardware state of the device. As discussed above, the component may comprise a software component or a bitstream, and the measurement may comprise a result of a cryptographic calculation performed on the component or state. In step 420, the method 400 comprises using the control logic to generate a challenge for submission to the PUF on the basis of the received measurement.

As illustrated in step 420*a*, in some examples, using the control logic to generate a challenge for the PUF on the basis of the received measurement may comprise inputting to an input one way function the received measurement and the preceding result of the input one way function. The input one way function may be configured to generate data based on at least the received measurement for input to a challenge one way function. In step 420*b*, using the control logic to generate a challenge for the PUF on the basis of the received measurement may further comprise configuring a switch to be in a first position when a PUF response is to be generated on the basis of a challenge generated by a challenge one way function on the basis of data based on at least the received measurement and input to the challenge one way function. The switch may be configured not to be in the first position when a PUF response is to be generated on the basis of a challenge generated by the challenge one way function on the basis of data provided by a component booted on the device and input to the challenge one way function.

As illustrated at 420*c*, using the control logic to generate a challenge for the PUF on the basis of the received measurement may further comprise inputting data based on at least the received measurement to a challenge one way function, wherein the challenge one way function is configured to generate the challenge for submission to the PUF. The data based on at least the received measurement may comprise a measurement value or data generated by an input one way function on the basis of the a measurement value and the preceding result of the input one way function.

As illustrated at step 420*d*, using the control logic to generate a challenge for the PUF on the basis of the received measurement may further comprise inputting data provided by a component booted on the device to the challenge one way function. According to some examples, either component provided data or measurement data may be input to the challenge one way function, and in some examples measurement data may be alternated with component provided data.

As illustrated at 420*e*, using the control logic to generate a challenge for the PUF on the basis of the received measurement may further comprise inputting data based on a current response generated by the PUF to the challenge one way function. This data may be read from a loopback register, and its input to the challenge one way function may be conditional upon the switch of step 420*b* being in a first position. As noted above, the switch of step 420*b* may be configured to be in the first position for PUF responses to challenges based on component measurements, and not in the first position for PUF responses to challenges based on component data. In this manner, PUF responses to challenges based on measurement values may be fed back to update the next challenge, whereas PUF responses to challenges based on component provided data may not be fed back.

In some examples, it may be the case that not all outputs of the challenge one way function are valid challenges for the PUF. As illustrated at step 420*f*, using the control logic to generate a challenge for the PUF on the basis of the received measurement may further comprise determining whether or not an output from the challenge one way function is a valid challenge for the PUF, and if the output from the challenge one way function is not a valid challenge for the PUF, converting the output of the challenge one way function into a valid challenge for the PUF. This conversion may be achieved by performing at least one of inputting the output of the challenge one way function to the challenge one way function until a valid challenge for the PUF is obtained, translating the output of the challenge one way function into a valid challenge for the PUF, or correcting the output of the challenge one way function into a valid challenge for the PUF. Translating the output of the challenge one way function may comprise using a look up table for mapping from an output that is not a valid challenge to a valid challenge. Correction of the output of the challenge one way function may comprise using error correction or fuzzy extraction techniques.

Referring still to FIG. 4, the method 400 comprises generating a PUF response on the basis of the generated challenge in step 430, and generating a security component output on the basis of the PUF response in step 440. As illustrated at 440a, generating the security component output may comprise correcting for errors in the PUF response, for example by submitting the PUF response to an error correction module. Correcting for errors in the PUF response may comprise extracting and saving, for example in a memory of the device, helper data from a first generated response to a challenge, and may comprise using the helper data to perform error correction on subsequently generated responses to the challenge. The helper data may comprise one or more error correcting codes. As illustrated at 440b, generating the security component output may further comprise inputting the PUF response to an output one way function, wherein the output one way function is configured to generate the security component output. In other examples, as illustrated at 440c, generating the security component output may comprise inputting both the PUF response and an identifier of a component requesting a response from the PUF to the output one way function. In this manner, the security component output may be made specific not only to the PUF response, and consequently the components booted on the device, but also to the particular component requesting the PUF response.

The methods 300, 400 may be implemented via a computer program stored on the device, and the present disclosure provides a computer program product comprising a computer readable medium, the computer readable medium having computer readable code embodied therein, the computer readable code being configured such that, on execution by a suitable computer or processor, the computer or processor is caused to perform a method according to any of the examples described herein.

There now follows a discussion of different implementations of a security component according to the present disclosure. The implementations illustrate four different examples of how features of the above discussed security components may be combined to achieve particular functionality. The examples are as follows:

Example 1 (Input chain solution)—A PUF using chained inputs to create a unique chain of responses.

Example 2 (User-determined input update solution)—A PUF enabling user-supplied inputs, using a combination of loopback register and input register to guarantee unique responses.

Example 3 (Component HW ID solution)—A PUF which, in addition to user-supplied inputs, also uses a Hardware ID from the calling component to create a unique response.

Example 4 (Error correction solution)—A PUF which, in addition to enabling user-supplied inputs, uses user-supplied helper data to recreate correct PUF responses.

As set out above, the security component examples comprise a PUF, having a plurality of sub functions, and control logic. In the presently described examples, the PUF is of the challenge-response, electronic measurement type, relying on implicit randomness. The PUF could however be implemented using explicit randomness. In this type of PUF, the challenge and response could be submitted using for example optics, radio frequencies or magnetism. In these cases, the challenge and response could be translated from and to electric signals when interacting with the PUF.

The control logic may comprise the following features:

An input one way function OwF0, which takes incoming measurements and the current value of an input register as input. The output of OwF0 is written to the input register.

A challenge one way function OwF1, which takes a loopback and input register as input and writes its output to a challenge register.

An output one way function OwF2, which takes each response bit from the PUFs sub functions as input and writes its output to an output register. This function can be excluded if the challenge-response PUF itself is fully capable of breaking correlation between outputs.

An input register, a loopback register, an output register, a challenge register and a loopback switch.

An error correction module which takes the PUF response and an enrol mode signal as input. If the enrol mode signal is not activated, the error correction module takes an additional helper data input. If the enrol mode signal is activated, the error correction module outputs helper data which can be saved by the component requesting the PUF response or by a dedicated component for handling helper data.

The combination of loopback register and input register are referred to in the following disclosure as representing the "state" of the security component. It will be appreciated that in some examples, OwF0, OwF1 and OwF2 may be the same key derivation function implementation arbitrated to realise all the one way functions described above.

It will be appreciated that the PUF design, and the connections between the challenge and PUF sub functions in the Figures discussed below are examples provided for the purpose of illustration. Other designs and connections may be envisaged.

Example 1

Figure 5:
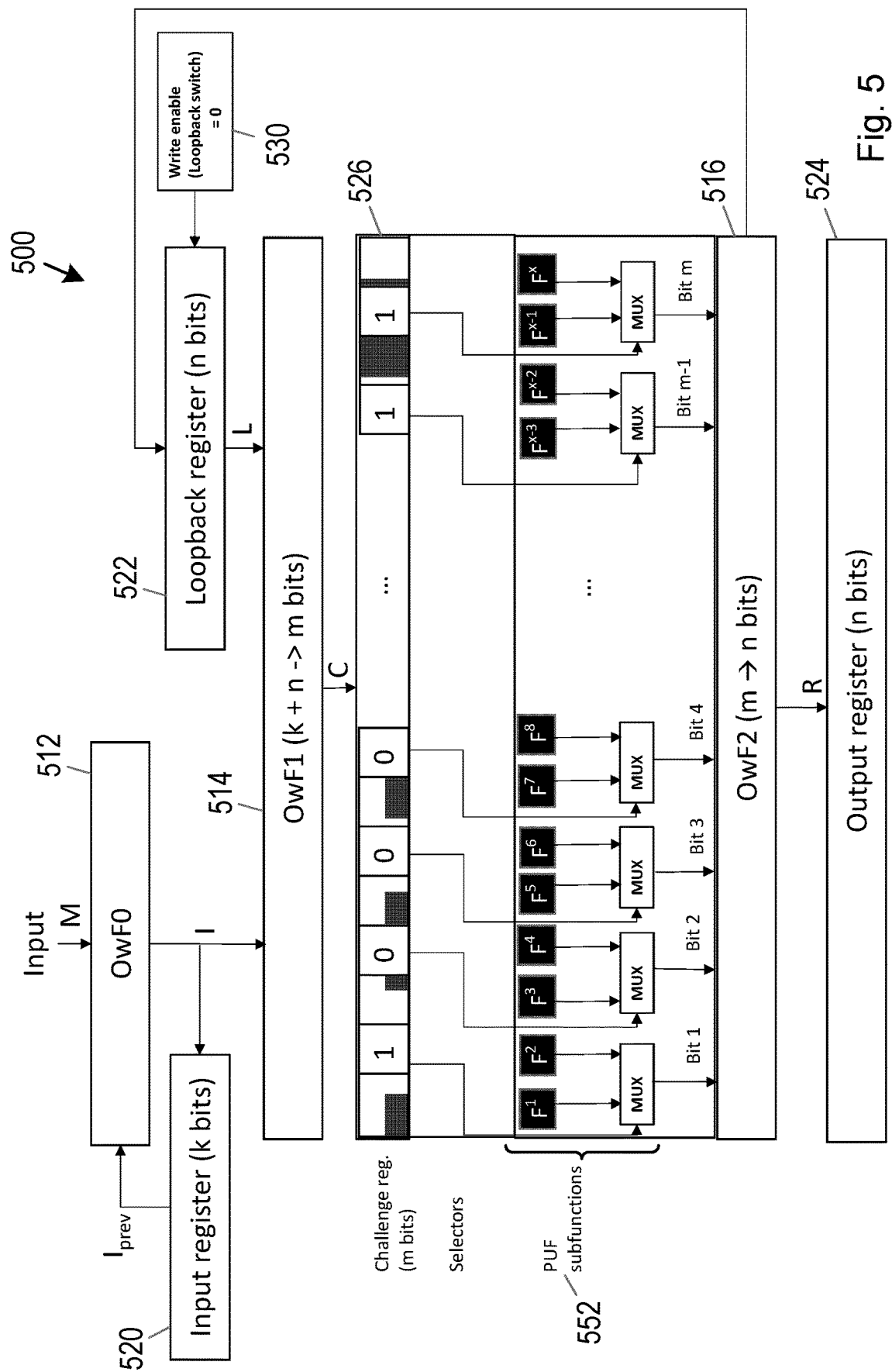
FIGS. 5 and 6 illustrate implementations of a security component according to a first example.
Figure 7:
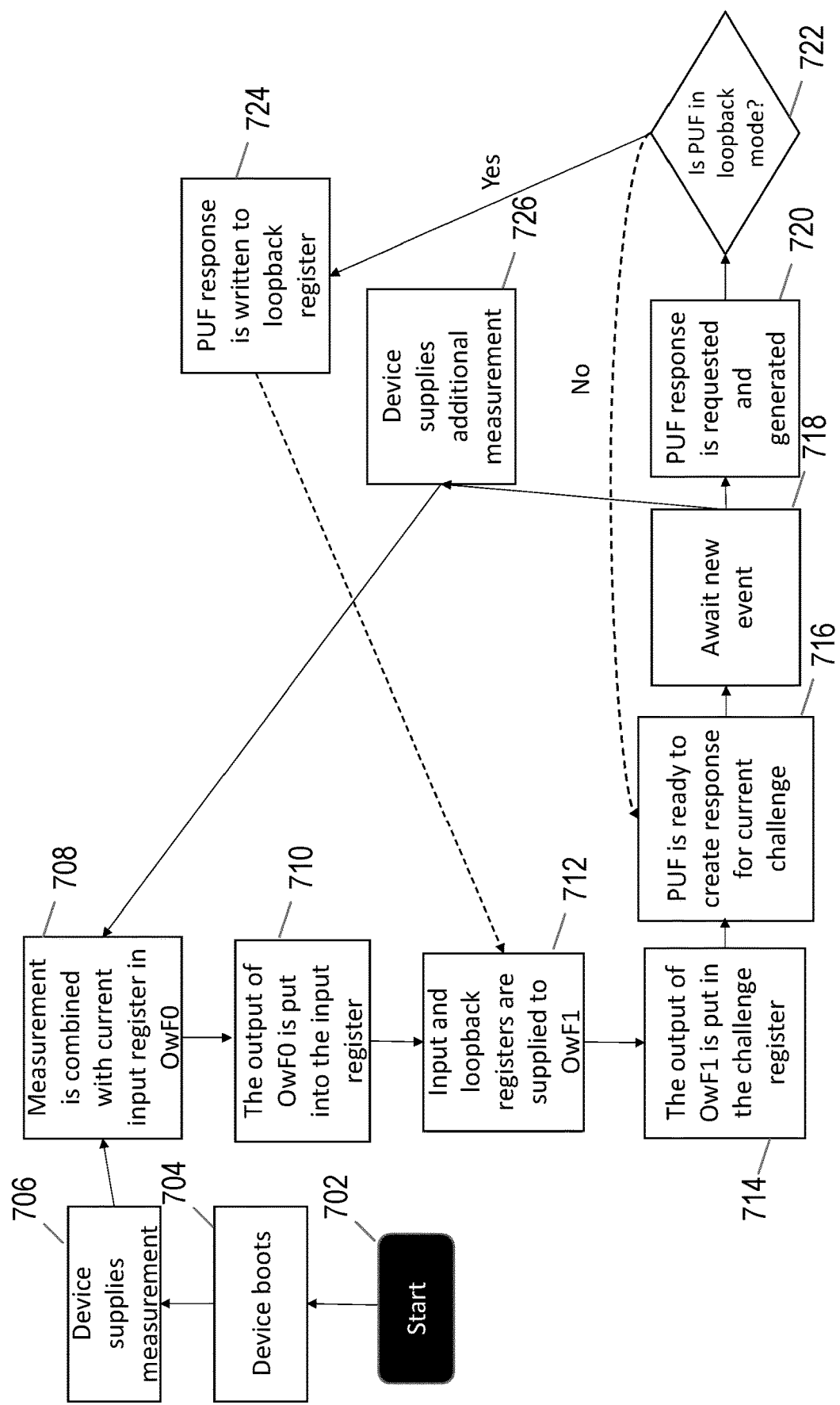
FIG. 7 illustrates a usage cycle for the security component of FIGS. 5 and 6.

The first example realization of a security component is illustrated in FIGS. 5 (input only mode—loopback switch not activated), and 6 (loopback mode—loopback switch activated). An example usage cycle is illustrated in FIG. 7. It will be appreciated that the security of the illustrated security component is not dependent on any particular element being secret. However, all parts of the component should be integrity and access protected. As is the case for a Trusted Platform Module (TPM), measurements of booted components are required to be written by a trusted boot process.

Referring to FIG. 5, the security component 500 of the first example comprises a loopback register 522 and input register 520. These registers have initial values, prior to loading of any components and consequently to receiving any measurements. The initial values are pre-defined and may for example consist of all 0's. This initial combination of input and loopback register values, i.e. the initial state, will not be used to extract a PUF response but is rather a starting point for usage. During boot, the device on which the security component 500 is installed supplies measurements, M. In the example of FIG. 5, these measurements are concatenated with the current value $I_{prev}$ of the input register 520. The two values form a set $\{M, I_{prev}\}$ This set is supplied to the input one way function OwF0 512. The output of OwF0, denoted I, is written to the input register 520.

Each set of challenges created by concatenating the current input register value and a new input is referred to as an "input state chain". Each input state chain is unique, meaning that for a measurement M1 and initial state I0, which together result in I1, it is not computationally feasible to start with a different measurement M2 and continue adding measurements to eventually reach I1. In this manner it is possible to protect responses belonging to a specific set of boot components from all other possible sets of boot components (even the same boot components in a different order).

As discussed above, the input register 520 and the loopback register 522 are jointly referred to as the state of the security component {input register value (I), loopback register value (L)}. This state is supplied to the challenge one way function OwF1 514. OwF1 514 outputs a binary string, which is written to the challenge register 526. Each bit in the challenge corresponds to a choice or configuration of sub functions 552, the exact choosing or configuration mechanism is specific to each realization of the PUF sub functions 552. In the event that the output of OwF1 514 is not a valid challenge for the PUF, various options exist for converting the output to a valid challenge, including resubmitting the output to OwF1 until a valid challenge is obtained, translation using a lookup table or correction.

Once a new measurement is supplied to OwF1, the PUF does not generate any response until the output of OwF1 is ready.

When a response is generated, the output from the PUF sub functions 552, decided by the challenge register 526, is supplied to the output one way function OwF2 516. OwF2 516 is used to break any correlation between the PUF responses. This enables usage of PUFs which have some response correlation, for example between challenges with low hamming distance. It will be appreciated that while in FIGS. 5 and 6 the challenge and PUF response are illustrated as being of equal length (m bits), this is merely for the purpose of illustration. In practice the PUF challenge and PUF response may be of different lengths. The challenge may be substantially longer than the response (a 64 bit challenge per 1 bit response for example).

Figure 6:
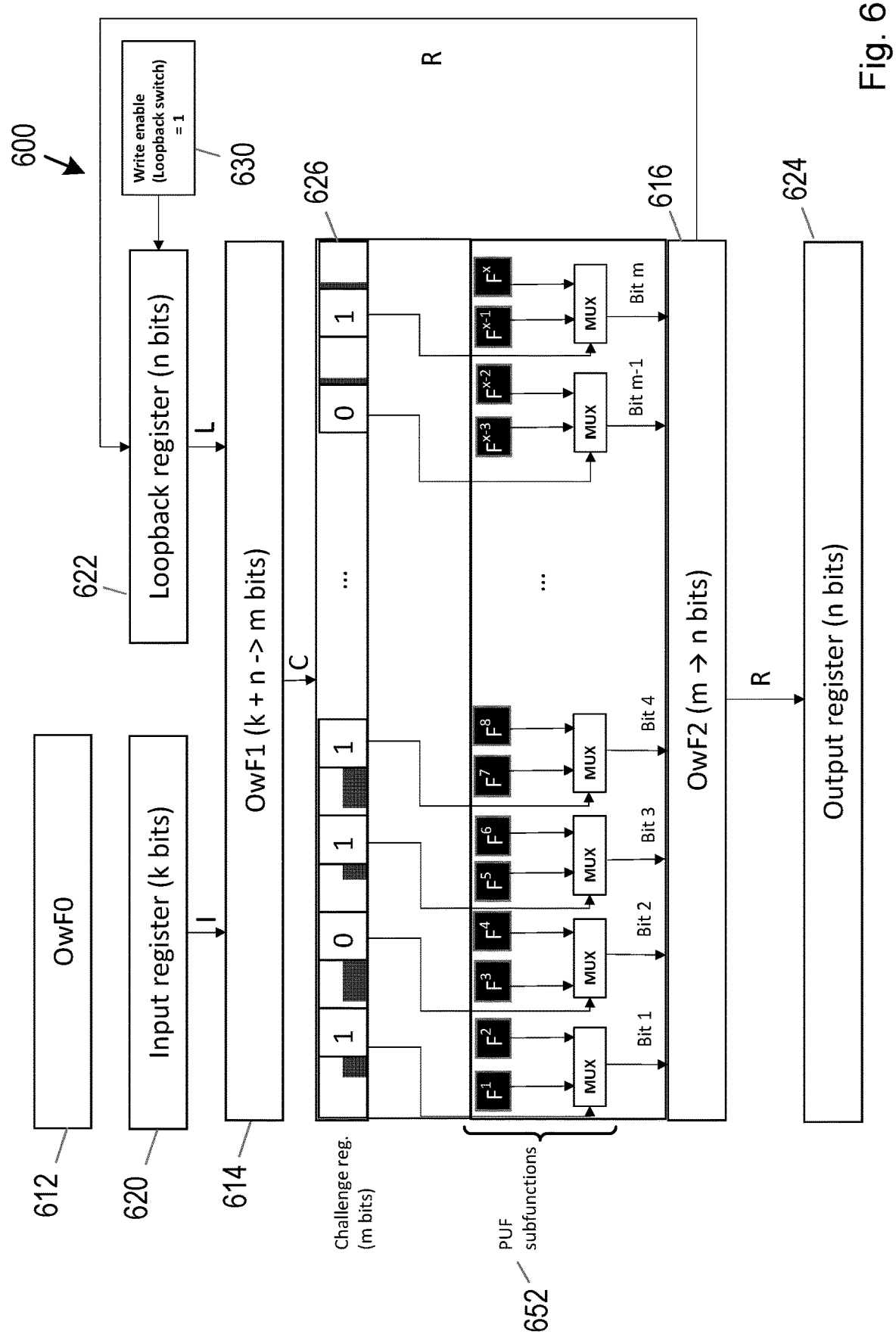

Response generation can be performed in two modes, either input-only mode (illustrated in FIG. 5) or loopback mode (illustrated in FIG. 6). In input-only mode (FIG. 5), the loopback register 522 remains unchanged while the input register 520 is updated by the measurements supplied by the device. The challenge generated by the control logic is therefore determined by measurements from booted components only. This approach gives each booted component access to a unique PUF response, while not being able to recreate any response belonging to a previously booted component. Any changes in the boot order or components will result in different keys at every stage. For example, component boot order 1-2-3 will give different responses for every component compared to boot order 4-2-3 or 3-2-1. However, boot order 1-2-3 and boot order 1-3-2 will give component 1 the same response.

Loopback mode (FIG. 6) resembles input-only mode. For example, the security component 600 of FIG. 6 comprises a loop back register 622 and input register 620, as well as a challenge one way function OwF1 614 and an input one way function OwF0 612, although in the example of FIG. 6, OWF0 612 is not active, because the value that is already present in the input register 620 is used. Loopback mode, as illustrated in FIG. 6, adds the feature that the challenge register 626 is also affected by every generated PUF response. The loopback register 622 is updated after each generated response, and the updated loopback register value is input to the challenge one way function OwF1 614, together with the input from the input register 620, in order to generate the challenge for writing to the challenge register 626. This approach can be used to derive new responses which can only be reached from the current state, i.e. it is computationally infeasible to reach a particular response from any state other than the current one. This makes it possible to create sub-responses to a specific response, sub-sub-responses etc. There is no limit for how many times this can be done. If the response is used for cryptographic purposes, it becomes possible to derive keys without using an external KDF.

The mode of operation of a security component is decided by a loopback switch. If the loopback switch is activated (set to 1), as in FIG. 6, this indicates that the loopback register should be updated after each generation of a PUF response. If the loopback switch is inactivated (set to 0), as in FIG. 5, this indicates that the loopback register should remain static.

FIG. 7 illustrates a usage cycle of a security component according to example 1 installed on a device. Referring to FIG. 7, the cycle starts at step 702, and the device boots at step 704. In step 706, the device supplies a measurement of a first booted component, which measurement is combined with the current value of the input register in the input one way function at step 708. In step 710, the output of the input one way function is written to the input register. Input and loopback registers are then supplied to the challenge one way function in step 712, and the output of the challenge one way function is written to the challenge register in step 714. In step 716, the PUF is then ready to create a response for the current challenge, and the security component awaits a new event at step 718. In step 720, a PUF response is requested and generated, and subsequent action depends upon whether the security component is operating in input only or loopback mode, as determined at step 722. If the security component is operating in input only mode, then the security components returns to step 716, being ready to create a response for the current challenge. If the security component is operating in loopback mode, then the PUF response is written to the loopback register in step 724, and the security component returns to step 712, supplying the loopback register and input register to the challenge one way function in order to generate a new challenge. Returning to step 718, if the new event that occurs is the receipt of a new boot component measurement from the device in step 726, then the security component returns to step 708, in order to generate new input and consequently a new challenge.

The above discussed usage cycle is embodied in the example functional descriptions of operation of the security components 500 and 600. It will be appreciated that components 500 and 600 may comprise the same security component, with the loopback switch activated (FIG. 6) or inactivated (FIG. 5).

Operation in Input Only Mode (FIG. 5)
    The device commences boot sequence.
    Initialization
        The initial values, I0 and L0 respectively, are written to the input and loopback registers 520, 522.
        {I0, L0} is provided as input to OwF1 514 and the output becomes the initial challenge, C0.
    The Boot ROM measures the first boot component and supplies the measurement, M1.
        M1 is concatenated with the current value of the input register 520, I0, and forms a set, {M1, I0}.

{M1, 10} is sent to OwF0 512 and the result, I1, is written to the input register 520.

{I1, L0} is provided as input to OwF1 514 and the output becomes the new challenge, C1.

The first boot component measures the second boot component. It supplies the measurement, M2. This step is equivalent to the step described above where the Boot ROM measures the first boot component.

M2 is concatenated with the current value of the input register 520, I1, and forms a set, {M2, I1}.

{M2, I1} is sent to OwF0 512 and the result, I2, is written to the input register 520.

{I2, L0} is provided as input to OwF1 514 and the output becomes the new challenge, C2.

The device requests a PUF response, with the loopback switch deactivated.

The challenge, C2, decides which sub functions 552 the PUF should use and in what order. The result of the sub functions are sent to OwF2 516 to create the result, R1.

R1 is written to the output register 524.

As loopback switch was deactivated, R1 is not provided to the loopback register 522.

The device will continue to generate R1 upon request until a new measurement is received or the request is sent with the loopback switch activated.

Operation in Loopback Mode (FIG. 6)

The device commences boot sequence.

Initialization

The initial values, I0 and L0 respectively, are written to the input and loopback registers 620, 622.

{I0, L0} is provided as input to OwF1 614 and the output becomes the initial challenge, C0.

The Boot ROM measures the first boot component and supplies the measurement, M1.

M1 is concatenated with the initial input, I0, and forms a set {M1, I0}.

{M1, I0} is sent to OwF0 612 and the result, I1, is written to the input register.

{I1, L0} is provided as input to OwF1 614 and the output becomes the new challenge, C1.

The device requests a PUF response, with the loopback switch activated.

The challenge, C1, decides which sub functions 652 the PUF should use and in what order. The result of the sub functions are sent to OwF2 616 to create the result, R1.

R1 is written to the output register 624.

As the loopback switch was activated, R1 is provided to the loopback register 622, L0 is replaced. The new value is denoted as L1.

Each consecutive generation of a PUF response (without supplying an input value) with the loopback switch activated, will update the loopback register 622, create a new challenge and generate new a response.

Example 2

Figure 8:
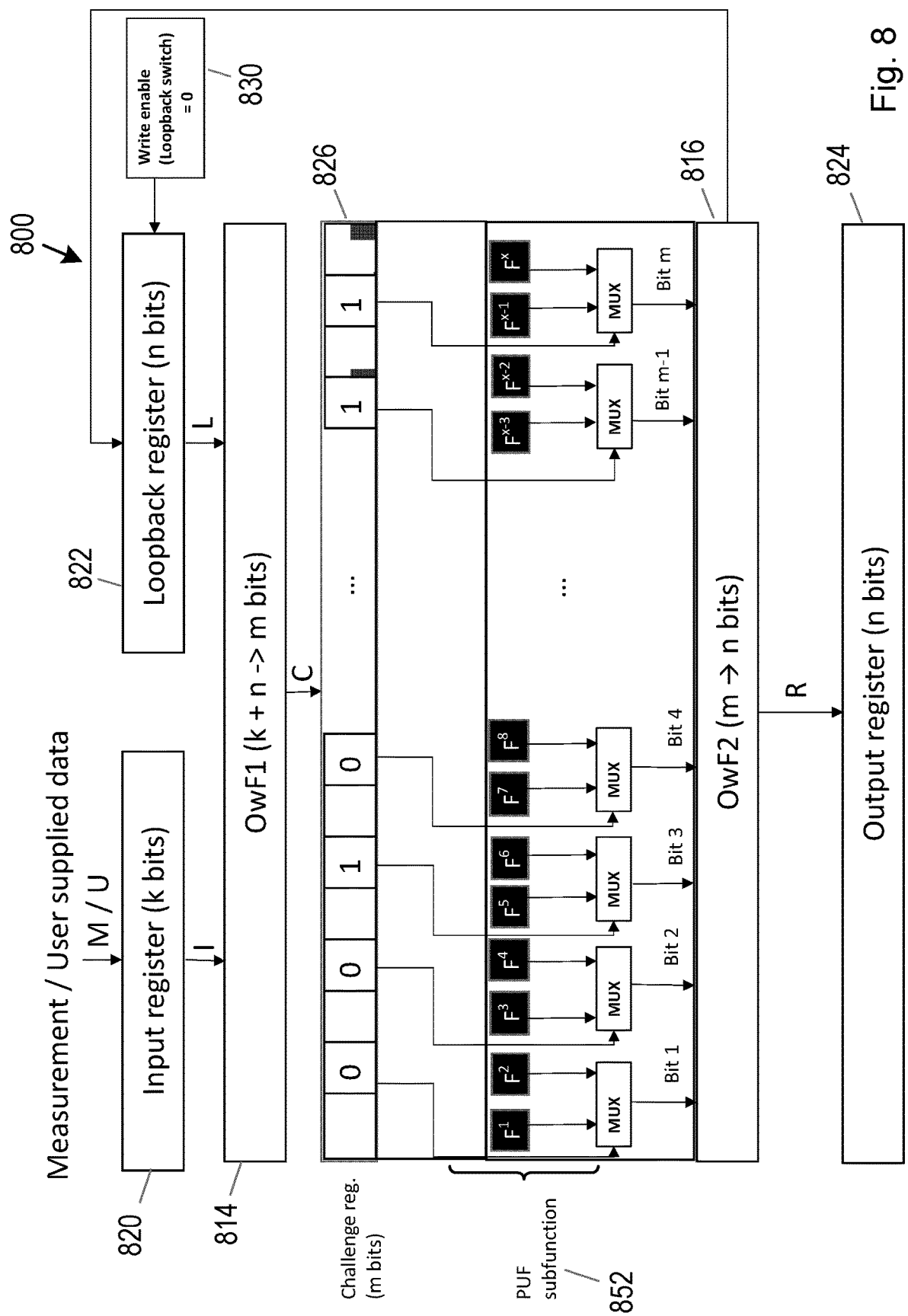
FIGS. 8 and 9 illustrate implementations of a security component according to a second example.
Figure 10:
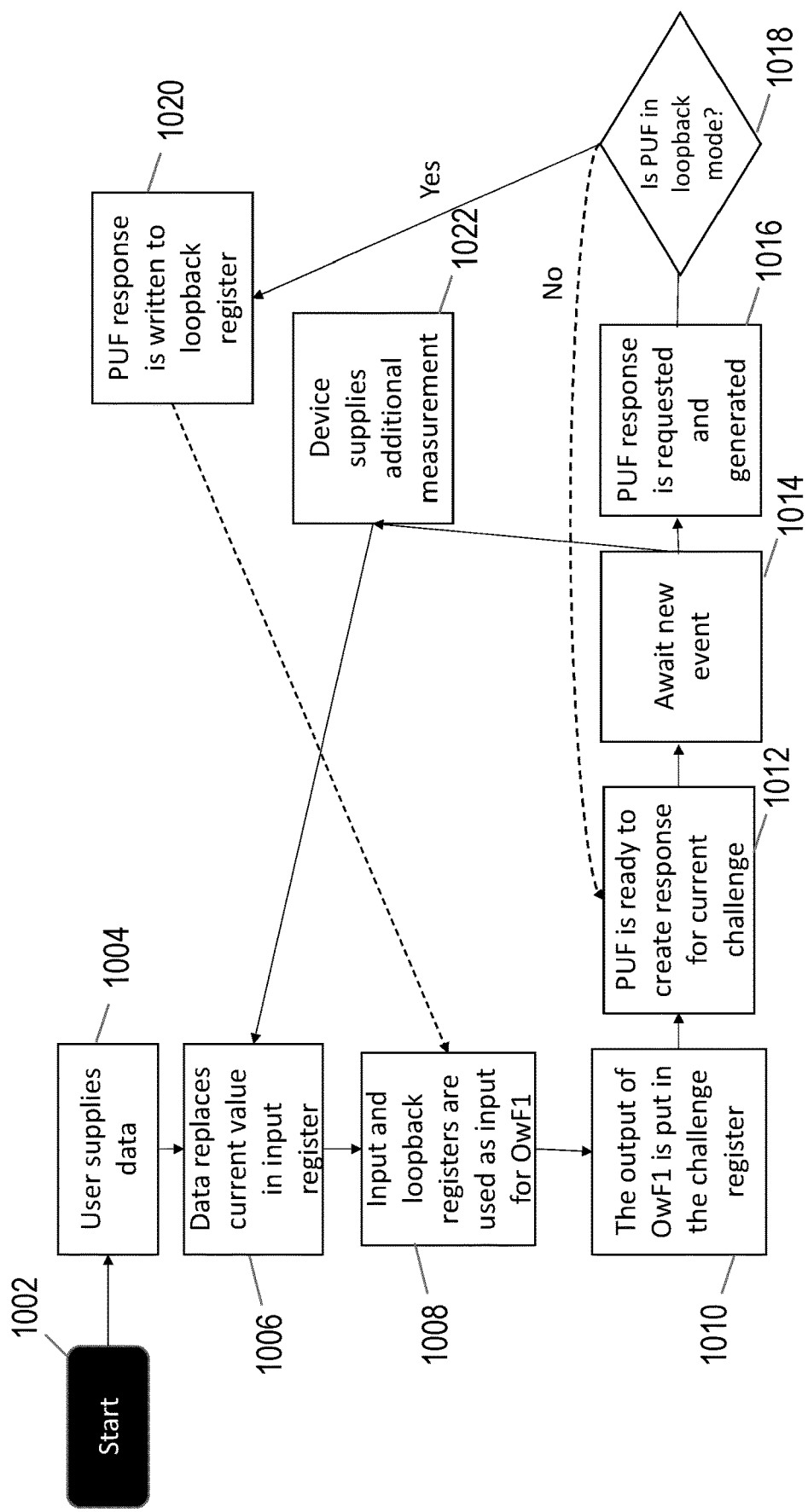
FIG. 10 illustrates a usage cycle for the security component of FIGS. 8 and 9.

The second example realization of a security component is illustrated in FIGS. 8 (input only mode—loopback switch not activated), and 9 (loopback mode—loopback switch activated). An example process flow is illustrated in FIG. 10. It will be appreciated that the security of the illustrated security component is not dependent on any particular element being secret. However, all parts of the component should be integrity and access protected. As is the case for a Trusted Platform Module (TPM), measurements of booted components are required to be written by a trusted boot process.

In the second example, a user may determine a state, and the input one way function of the first example, OwF0, is omitted. Boot component measurements are written directly to the input register 820, 920 and overwrite the current value. Each component may also overwrite the input register with an arbitrary input value. An important difference with respect to the first example is that it is up to the user to ensure that a challenge cannot be reused. This is done by activating the loopback switch.

Example 2 enables non-deterministic user invocations, where the order of the invocations is not given. If the security component 800, 900 is in a particular state, and the PUF is invoked with loopback switch inactivated, i.e. not set to update the challenge, it is possible for component 1 and 2 to get the same keys regardless of whether the PUF is invoked in order 1-2 or 2-1.

A possible use case for example 2 could be that the security component state is updated by each boot component with the loopback switch activated. Within each boot component, multiple clients can call the PUF with unique challenges, based on user supplied data input to the input register 820, 920, but without updating the loopback register 822, 922. The security component may in this manner act as a parametrized key derivation function in which the order in which clients call the PUF does not matter. As discussed above with reference to Example 1, in order to ensure a unique response that cannot be recreated at a later stage, the loopback register should be updated. To ensure that the response is both unique and connected to the boot measurements, the input register should be a measurement (i.e. not an arbitrary value supplied by a component) when updating the loopback register.

FIG. 10 illustrates a usage cycle of a security component according to example 2 installed on a device. Referring to FIG. 10, the cycle starts at step 1002, and user data is supplied at step 1004. In step 1006, the user data replaces the current value of the input register. Input and loopback registers are then supplied to the challenge one way function in step 1008, and the output of the challenge one way function is written to the challenge register in step 1010. In step 1012, the PUF is then ready to create a response for the current challenge, and the security component awaits a new event at step 1014. In step 1016, a PUF response is requested and generated, and subsequent action depends upon whether the security component is operating in input only or loopback mode, as determined at step 1018. If the security component is operating in input only mode, then the security component returns to step 1012, being ready to create a response for the current challenge. If the security component is operating in loopback mode, then the PUF response is written to the loopback register in step 1020, and the security component returns to step 1008, supplying the loopback register and input register to the challenge one way function in order to generate a new challenge. Returning to step 1014, if the new event that occurs is the receipt of a new boot component measurement from the device in step 1022, then the security component returns to step 1008, in order to generate a new challenge.

The above discussed usage cycle is embodied in the example functional description of operation of the security components 800 and 900 below. It will be appreciated that components 800 and 900 may comprise the same security component, with the loopback switch activated (FIG. 9) or inactivated (FIG. 8).

The device commences boot sequence.
Initialization
> The initial values I0 and L0 respectively are written to the input 920 and loopback 922 registers.
> {I0, L0} is provided as input to OwF1 914 and the output becomes the initial challenge, C0.

The Boot ROM measures the first boot component and supplies the measurement, M1.
> M1 is written to the input register 920 and replaces I0. It is now denoted as I1.
> {I1, L0} is provided as input to OwF1 914 and the output becomes the new challenge, C1.
> The boot ROM requests a PUF response, with the loopback switch activated (FIG. 9).
> The challenge, C1, decides which sub functions 952 the PUF should use and in what order. The result of the sub functions is sent to OwF2 916 to create the result, R1.
> R1 is written to the output register 924.
> As loopback switch was activated, R1 is provided to the loopback register 922, L0 is replaced. The new value is denoted as L1.

The Boot ROM hands over execution to the first boot component

The first boot component provides a user-supplied value, U1, as input (see FIG. 8)
> U1 is written to the input register 820 and replaces I1. It is now denoted as I2.
> {I2, L1} is provided as input to OwF1 814 and the output becomes the new challenge, C2.
> The device requests a PUF response, with the loopback switch deactivated.
> The challenge, C2, decides which sub functions 852 the PUF should use and in what order. The result of the sub functions 852 are sent to OwF2 816 to create the result, R2.
> R2 is written to the output register 824.
> As loopback switch was deactivated, loopback register 822 is not updated.

Figure 9:
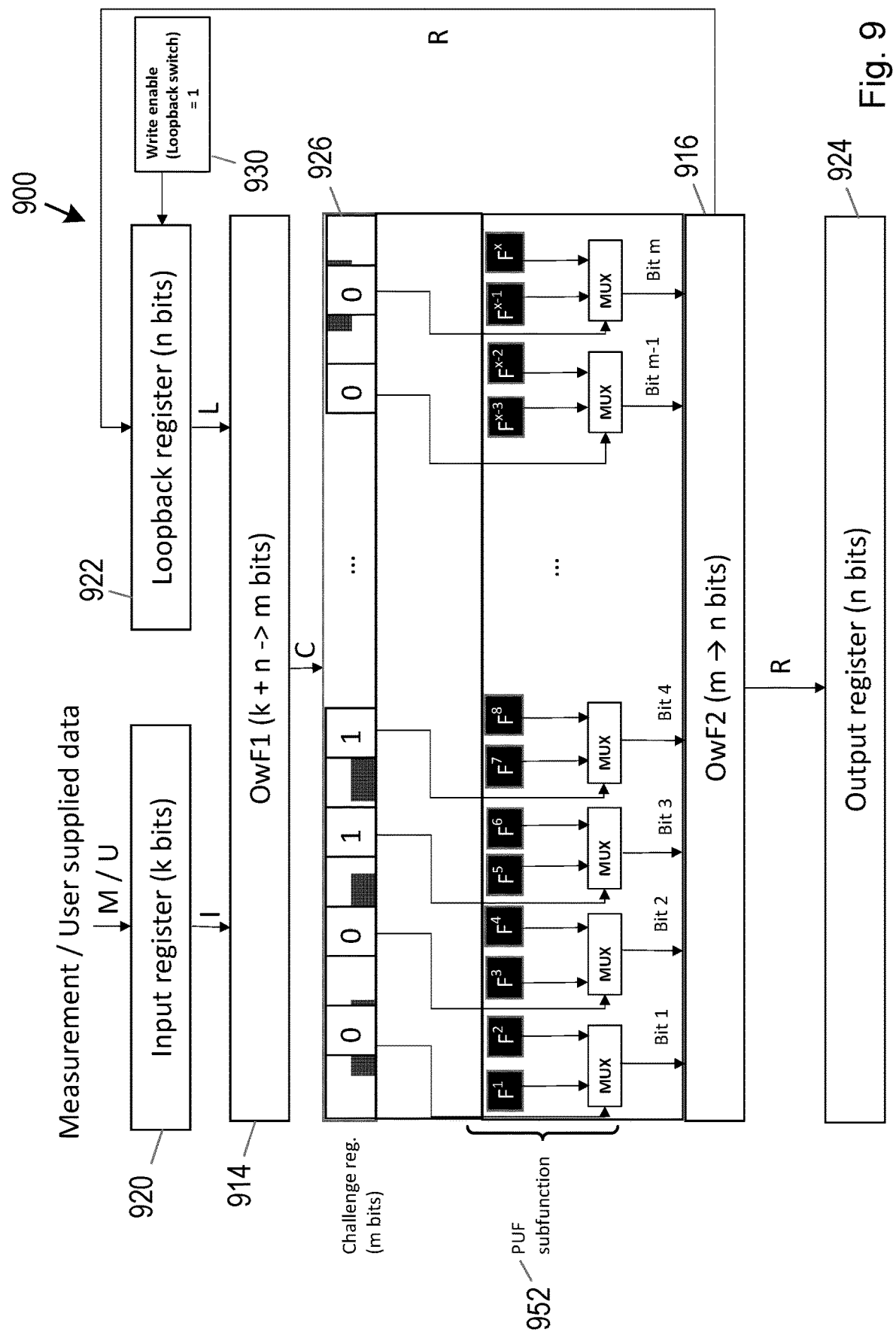

The first boot components measure the second boot component and supply the measurement, M2 (see FIG. 9). This step is equivalent to the step described above where the Boot ROM measures the first boot component.
> M2 is written to the input register 920 and replaces I2. It is now denoted as I3.
> {I3, L1} is provided as input to OwF1 914 and the output becomes the new challenge, C3.
> The device requests a PUF response, with the loopback switch activated.
> The challenge, C3, decides which sub functions 952 the PUF should use and in what order. The result of the sub functions 952 are sent to OwF2 916 to create the result, R3.
> R3 is written to the output register 924.
> As the loopback switch was activated, R3 is provided to the loopback register 922, L1 is replaced and the new value is denoted as L2.

It will be appreciated that while in FIGS. 8 and 9 the challenge and PUF response are illustrated as being of equal length (m bits), this is merely for the purpose of illustration. In practice the PUF challenge and PUF response may be of different lengths. The challenge may be substantially longer than the response (a 64 bit challenge per 1 bit response for example).

Example 3

Figure 11:
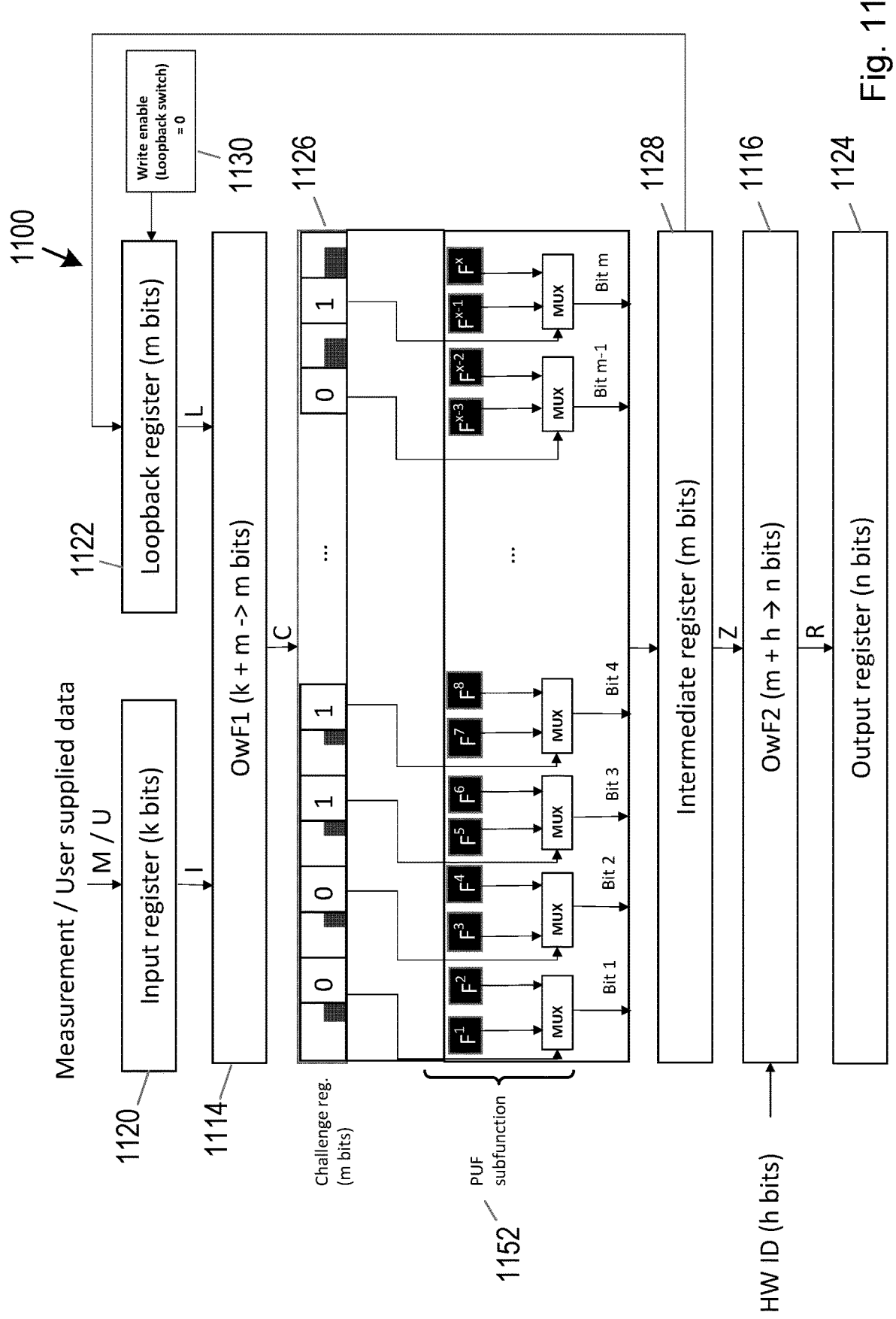
FIGS. 11 and 12 illustrate implementations of a security component according to a third example.

The third example realization of a security component is illustrated in FIGS. 11 (input only mode—loopback switch not activated), and 12 (loopback mode—loopback switch activated). It will be appreciated that the security of the illustrated security component is not dependent on any particular element being secret. However, all parts of the component should be integrity and access protected. As is the case for a Trusted Platform Module (TPM), measurements of booted components are required to be written by a trusted boot process.

Figure 12:
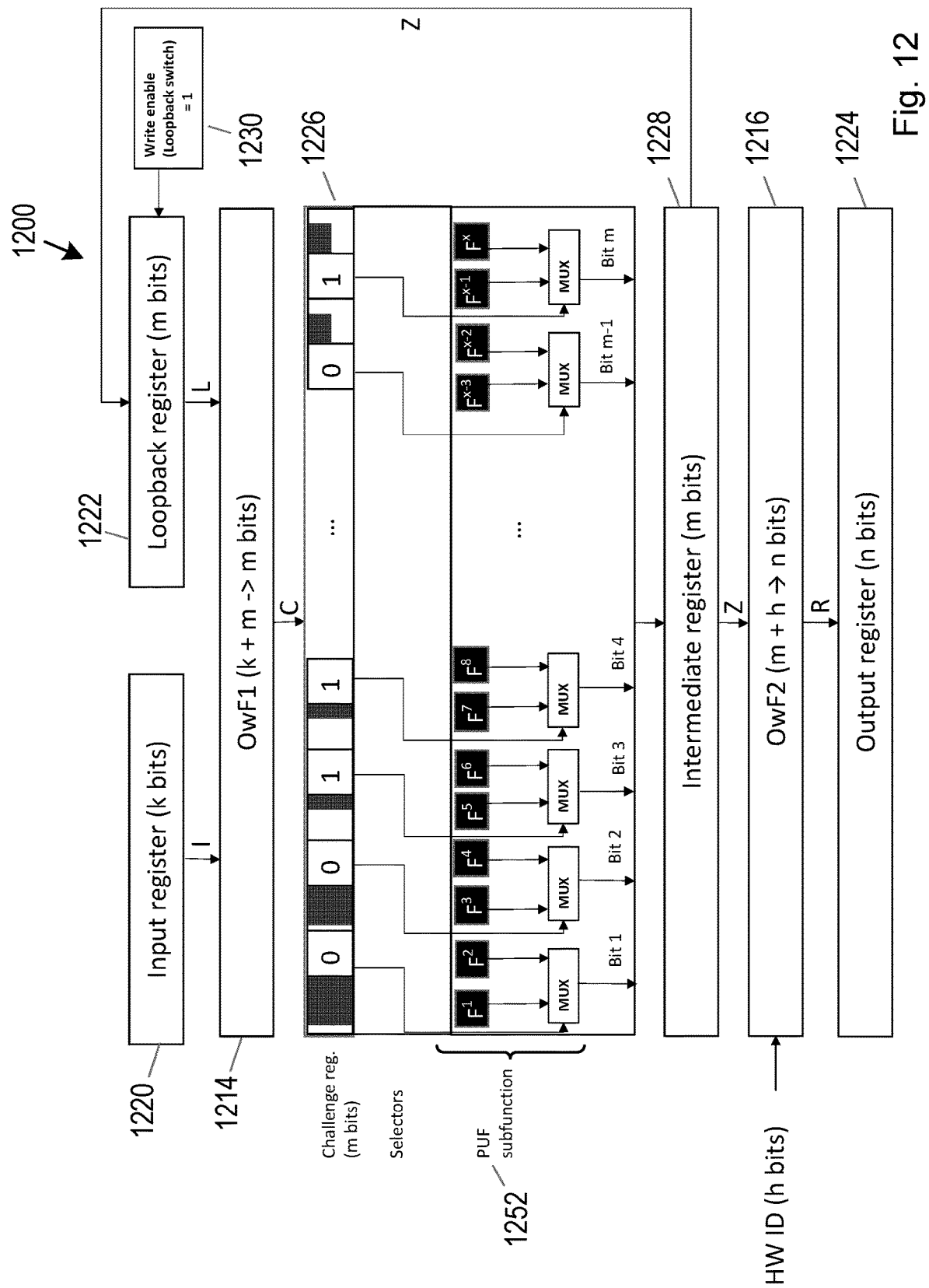

In the third example, a component Hardware identifier is combined with a PUF response to make the security component response specific both to components booted on the device and the component requesting the PUF response. FIGS. 11 and 12 present example 3 as a development of example 2, although this is merely for the purposes of illustration. The use of a hardware identifier could also be combined with the measurement chaining behaviour of example 1.

Example 3 adds a new input, the component HW ID, which is given as input to the output one way function OwF2 1116, 1216 and is discussed in detail below. Example 3 also adds a new register, the intermediate register 1128, 1228, placed between the sub functions 1152, 1252 and OwF2 1116, 1216. The intermediate register 1128, 1228 is used to provide state updates. A final change is that the loopback register 1122, 1222 is altered to hold the same number of bits as the intermediate register 1128, 1228. The intermediate register ensures that the value of the loopback register is dependent only on the PUF response, and not on the component identifier of the component that requested the response. Realizations of example 3 without this register are also possible, for example by letting each sub function 1152, 1252 output directly to the loopback register 1122, 1222. Realizations of example 3 with an additional one way function between sub functions 1152, 1252 and intermediate register 1128, 1228 are also possible.

Each component on a device with configurable components has an identifier, which is referred to in the present disclosure as a HW ID. This is a unique, known, identifier for each component. Examples of components having such identifiers include CPUs, GPUs, Ethernet controllers, power management units etc. Using the Component HW ID as an additional input to OwF2 adds another layer of specificity: the security component response becomes not only unique for a device and state but also for the component requesting a PUF response. For example, a CPU and GPU requesting a response from a security component with the same state will get different responses. Component HW ID is used in several different protocols, including for example AXI, in which communication channels are setup between different components by providing component HW IDs as a master and a slave ID.

The following functional description of operation of the security components 1100 and 1200 below illustrates an example of how they may be used. It will be appreciated that components 1100 and 1200 may comprise the same security component, with the loopback switch activated (FIG. 12) or inactivated (FIG. 11).

The device commences boot sequence.
Initialization
> The initial values, I0 and L0 respectively, are written to the input 1120, 1220 and loopback 1122, 1222 registers.
> {I0, L0} is provided as input to OwF1 1114, 1214 and the output becomes the initial challenge, C0.

When the first boot component has loaded, the Boot ROM sends it through a hash function and the result, M1, is written to input register.

{M1, L0} is provided as input to OwF1 1114, 1214 and the output becomes the new challenge, C1.

The device requests a PUF response, with the loopback switch activated (FIG. 12).

The challenge, C1, decides which sub functions 1152, 1252 the PUF should use and in what order. The result of the sub functions, Z1, is sent to the intermediate register 1128, 1228.

If loopback switch was activated, Z1 is provided to the loopback register 1222, R0 is replaced and the new value is denoted as L1.

The component hardware identification (HWID) and Z1 are combined and form {HWID, Z1}.

{HWID, Z1} is used as input to OwF2 1116, 1216. The output becomes the result, R1.

R1 is written to the output register 1124, 1224.

Example 4

Figure 13:
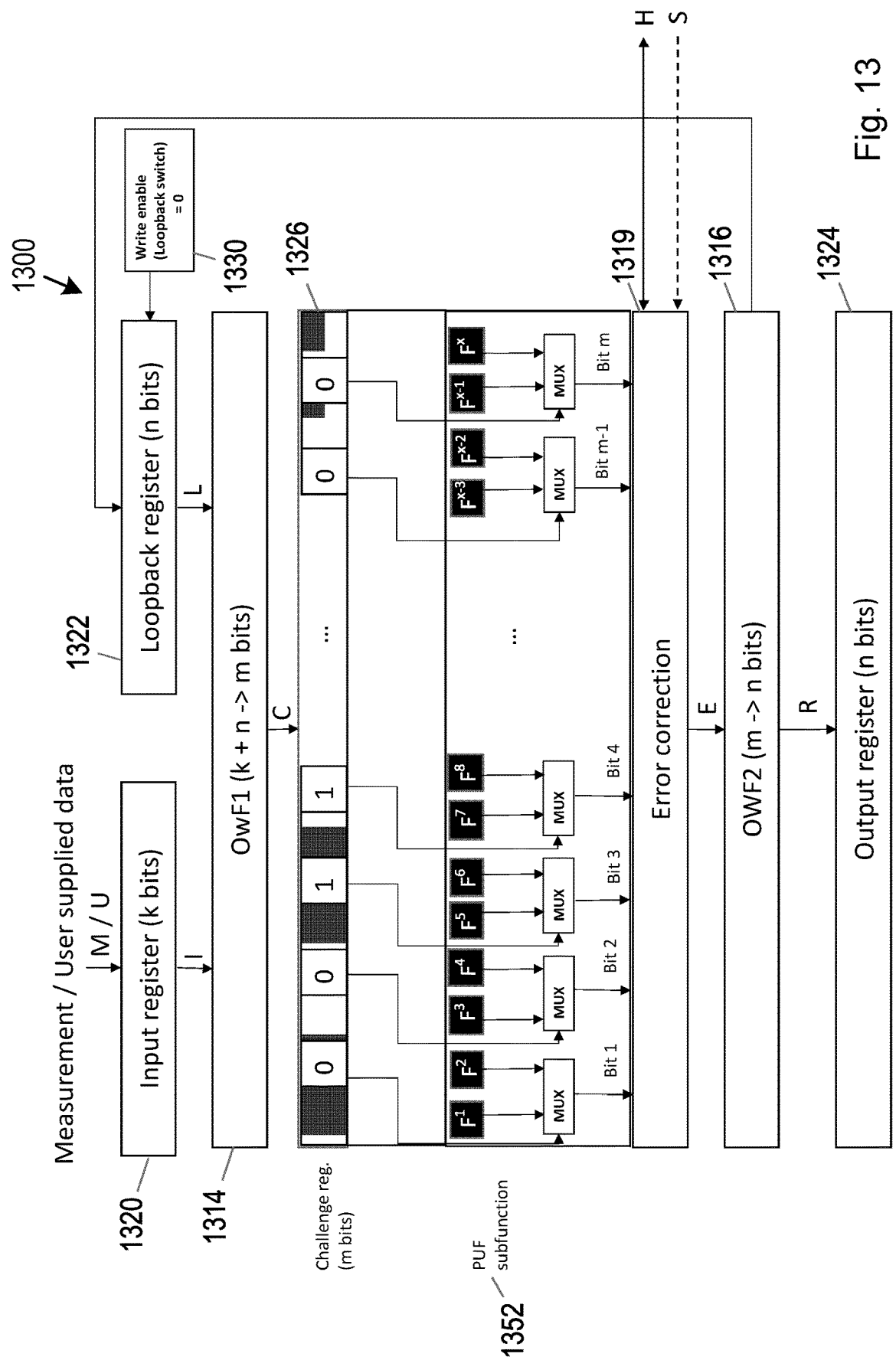
FIGS. 13 and 14 illustrate implementations of a secure component according to a fourth example.
Figure 15:
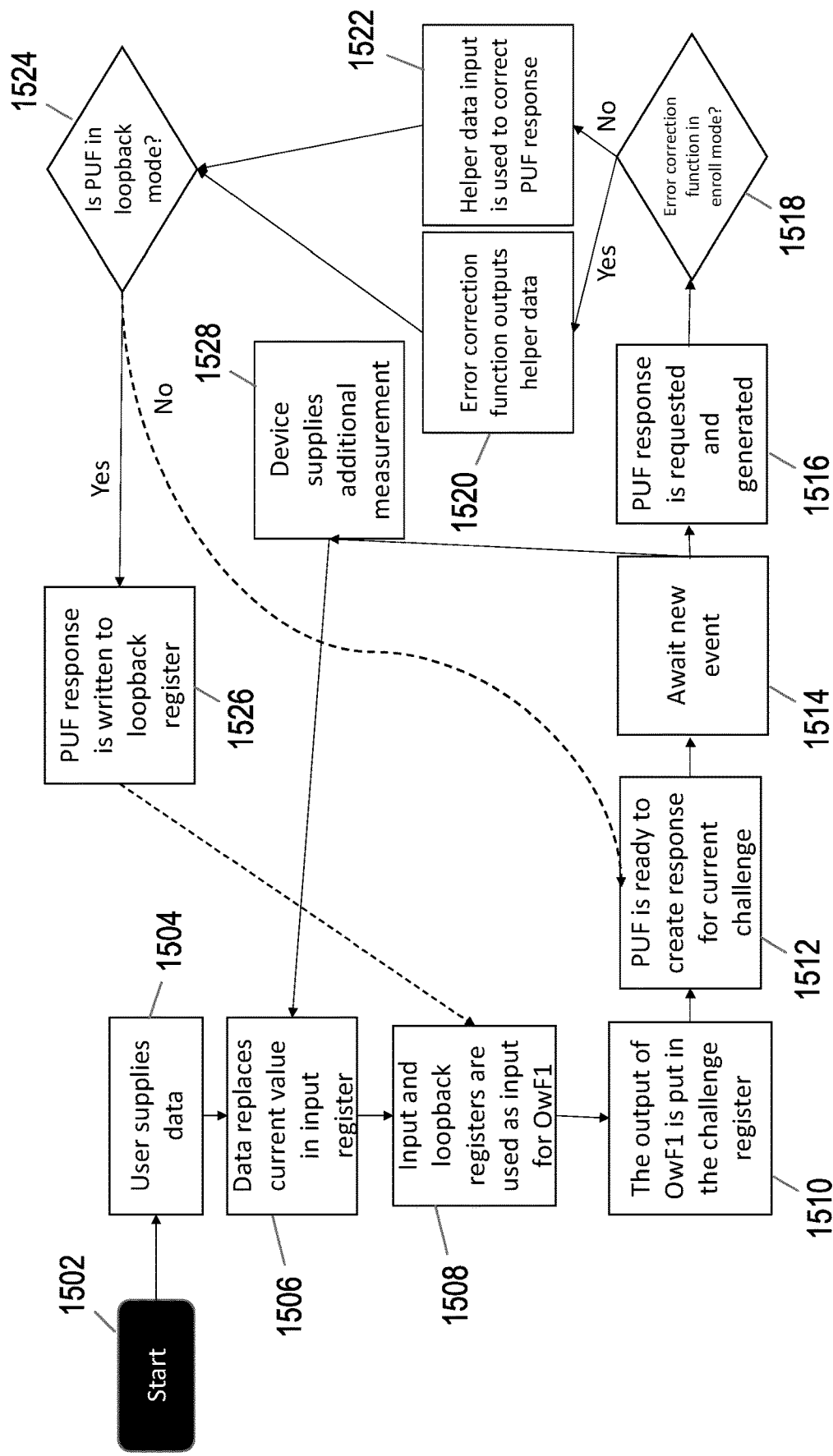
FIG. 15 illustrates a usage cycle for the security component of FIGS. 13 and 14.

The fourth example realization of a security component is illustrated in FIGS. 13 (input only mode—loopback switch not activated), and 14 (loopback mode—loopback switch activated). An example process flow is illustrated in FIG. 15. It will be appreciated that the security of the illustrated security component is not dependent on any particular element being secret. However, all parts of the component should be integrity and access protected. As is the case for a Trusted Platform Module (TPM), measurements of booted components are required to be written by a trusted boot process.

Figure 14:
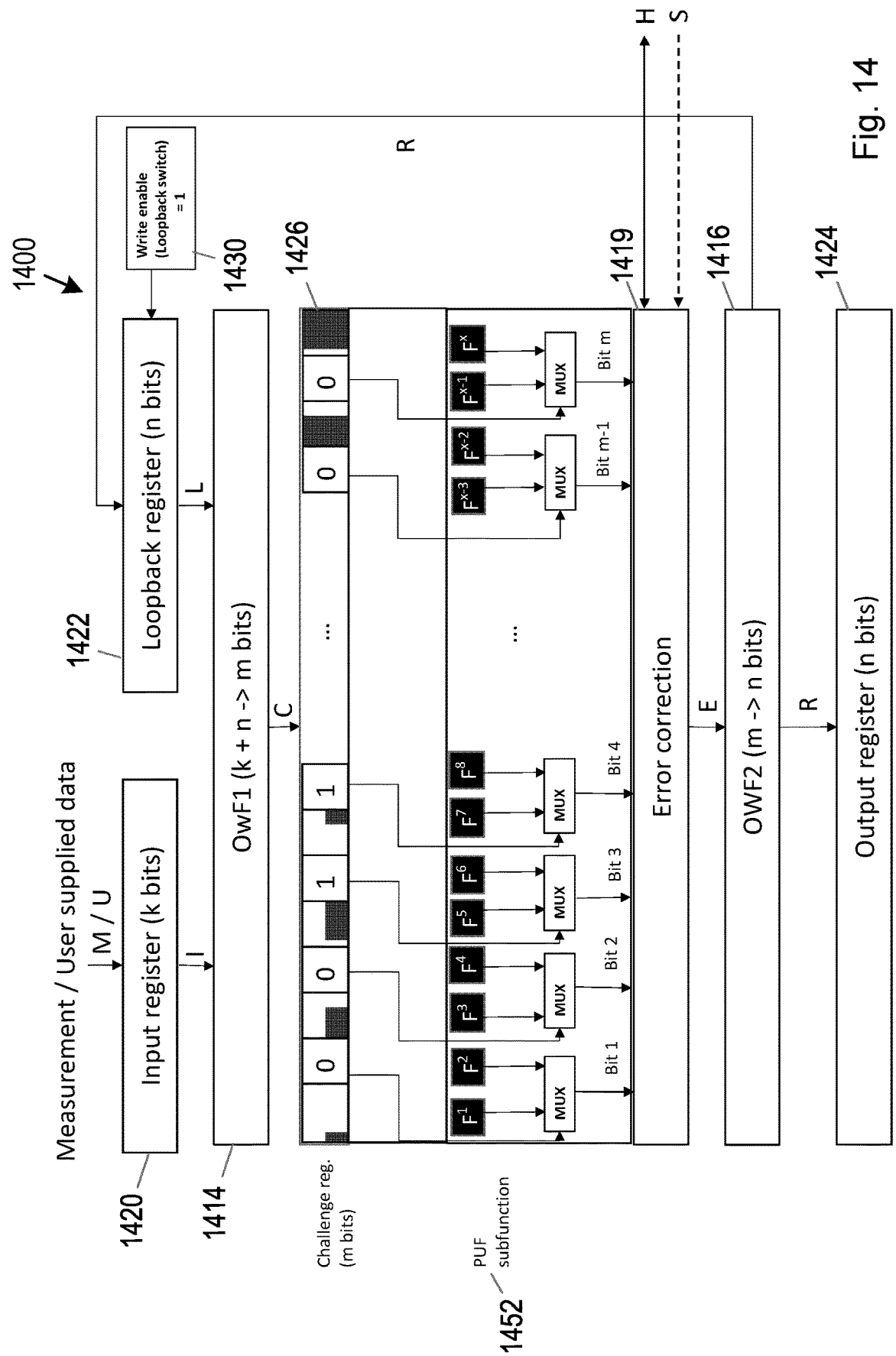

In the fourth example, an error correction module 1319, 1419 is added to the control logic, between the sub functions 1352, 1452 and the output one way function OwF2 1316, 1416. The error correction module 1319, 1419 is used to extract helper data from a first generated response to a challenge, which helper data can then be used to remove error from a PUF response at a later point in time. FIGS. 13 and 14 present example 4 as a development of example 2, although this is merely for the purposes of illustration. The use of an error correction module could also be combined with the measurement chaining behaviour of example 1 or add the HW ID input of example 3.

Example 4 adds two new inputs, helper data and enrol mode signal. These are provided to the error correction module 1319, 1419 and are discussed in detail below.

The enrol mode signal controls the behavior of the error correction module 1319, 1419. If the enrol mode signal is activated, the error correction module extracts helper data, such as error correction codes, from the generated PUF response, and outputs the helper data which can be stored by the module requesting the PUF response or by a dedicated component for handling helper data. If the enrol mode signal is activated, no error correction is made. If the enrol mode signal is not activated, helper data is input to the error correction module and is used to correct possible errors in generated PUF responses.

The error correction module may comprise one or several error correcting functions, and the helper data may comprise one or several types of error correction codes, such as BCH codes or Reed-Muller codes. The error correction module may also or alternatively comprise one or more bit selection functions, in which unreliable bits in the PUF response are removed. The bit selection functions may operate on the basis of knowledge of the characteristics of a particular PUF, and are therefore not specific to a particular challenge, as is the case with extracted helper data such as error correction codes.

FIG. 15 illustrates a usage cycle of a security component according to example 4 installed on a device. Referring to FIG. 15, the cycle starts at step 1502, and user data is supplied at step 1504. In step 1506, the user data replaces the current value of the input register. Input and loopback registers are then supplied to the challenge one way function in step 1508, and the output of the challenge one way function is written to the challenge register in step 1510. In step 1512, the PUF is then ready to create a response for the current challenge, and the security component awaits a new event at step 1514. In step 1516, a PUF response is requested and generated, and subsequent action depends upon whether the error correction module is operating in an enrol mode or a recreate mode, as illustrated at step 1518. If the error correction module is operating in an enrol mode, as indicated by activation of an enrol mode signal, the one or more error correction functions of the error correction module extract and output helper data, for example in the form of error correction codes, at step 1520. If the error correction module is operating in recreate mode, as indicated by the deactivation or absence of the enrol mode signal, the one or more error correction functions of the error correction module use helper data input to correct any errors in the presently generated PUF response at step 1522.

Further action in the usage cycle depends upon whether the security component is operating in input only or loopback mode, as determined at step 1524. If the security component is operating in input only mode, then the security component returns to step 1512, being ready to create a response for the current challenge. If the security component is operating in loopback mode, then the PUF response is written to the loopback register in step 1526, and the security component returns to step 1508, supplying the loopback register and input register to the challenge one way function in order to generate a new challenge. Returning to step 1514, if the new event that occurs is the receipt of a new boot component measurement from the device in step 1528, then the security component returns to step 1506, in order to replace the current value in the input register with the new measurement.

The above discussed usage cycle is embodied in the example functional description of operation of the security components 1300 and 1400 below. It will be appreciated that components 1300 and 1400 may comprise the same security component, with the loopback switch activated (FIG. 14) or inactivated (FIG. 13).

The device commences boot sequence.

Initialization

The initial values, I0 and L0 respectively, are written to the input 1320, 1420 and loopback 1322, 1422 registers.

{I0, L0} is provided as input to OwF1 1314, 1414 and the output becomes the initial challenge, C0.

The Boot ROM measures the first boot component and supplies the measurement, M1 together with associated helper data H1 and enrol mode signal S.

{M1, L0} is provided as input to OwF1 1314, 1414 and the output becomes the new challenge, C1.

The device requests a PUF response, with the loopback switch activated (FIG. 14).

The challenge, C1, decides which sub functions 1352, 1452 the PUF should use and in what order. The result of the sub functions is sent to the error correction module 1319, 1419.

If S is activated, the error correction module outputs helper data H2, extracted from the generated PUF response, which helper data can be stored by the component requesting the PUF response or by a dedicated component handling helper data. If S not activated, error correction module 1319, 1419 uses helper data H1 to correct any potential errors in the generated PUF response, and produce the result E1.

E1 is used as input to OwF2 1316, 1416. The output becomes the result, R1.

If loopback switch was activated, R1 is provided to the loopback register 1322, 1422, R0 is replaced and the new value is denoted as L1.

R1 is written to the output register 1324, 1424.

As illustrated by the above examples, aspects of the present disclosure provide a security component comprising a PUF, which component is effectively "aware" of the environment in which it is operating. This "awareness" is provided by processing measurements from loaded component through control logic comprising at least one one way function in order to form the challenge for the PUF. The PUF may thus generate a response which is not only unique to the PUF but also unique for the environment in which it is operating. The security component may therefore only generate certain a PUF response given specific measurements: loading unauthorized components will cause the PUF to produce a different response. In some examples, the security component may restrict a certain response to be generated only when certain boot components are booted in a specific order. Keys derived in a certain boot mode may therefore be protected, as the response providing the keys is unavailable using any different boot component configuration.

It will be appreciated that examples of the present disclosure may support up to 2^m states, m being the number of output bits from the challenge one way function, each state requiring a specific combination of measurements. No specific configuration of the security component is required, apart from the switch controlling loopback mode, if present. All combinations of measurements, that is all states, will allow access to the PUF, but each combination or state will generate a different response. All sub functions of the PUF remain active during the entire runtime, and security is assured by the challenge submitted to the PUF being neither decided by nor predictable by the client. The number of sub functions and configurations for each sub function in the PUF of security components according to the present disclosure may vary.

The following use cases may be envisaged for security components according to the present disclosure:

Using the security component output, or any derivate thereof, as a symmetric key. This can be used to encrypt data on- or off-chip, which data can only be decrypted when the device has been booted with certain components in a certain order.

Using the security component response, or any derivative thereof, as an asymmetric key. If the corresponding public key has been signed previously by a trusted entity, a signature with the private key can be used to indicate that the device has been booted with certain components in a certain order.

In one example of the present disclosure, measurements may be chained together using a one way function. Hence, if certain measurements are provided in certain order during boot, (e.g. M1, M2, M3), these each generate a unique state (S1, S2, S3). It is computationally infeasible for a malicious party to recreate S1, S2 or S3, even if it has knowledge of M1, M2 and M3. This protects PUF responses in one device setup from being exposed when the device is setup differently. In another example, each component may determine if the state shall be updated when supplying the measurement to the PUF. This example enables non-deterministic user invocations, where the invocation order is not given. In a third example, component HW ID may be used to create unique keys that are unique not only to device and setup but also to the component requesting the response.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality and a single processor or other unit may fulfil the functions of several units recited in the claims. Any reference signs in the claims shall not be construed so as to limit their scope.

The invention claimed is:

1. A security component for a device, the security component comprising:
   a Physically Unclonable Function (PUF) that is operable to accept a plurality of challenges and to generate a corresponding plurality of responses; and
   control logic configured to generate a challenge for submission to the PUF on the basis of at least one of measurements of components booted on the device or a measurement of a hardware state of the device, wherein the PUF comprises a plurality of sub functions, and wherein the challenge determines how the sub functions are used by the PUF to generate a PUF response.

2. The security component as claimed in claim 1, wherein the control logic comprises:
   an input register that is configured to be written with data based on at least a measurement of a component on the device, or a measurement of a hardware state of the device; and
   a challenge one way function that is configured to generate a challenge for submission to the PUF based on a current value of the input register.

3. The security component as claimed in claim 2, wherein the control logic further comprises conversion logic for converting an output of the challenge one way function, which output is not a valid challenge for the PUF, into a valid challenge for the PUF, wherein the conversion logic comprises at least one of:
   a feedback loop configured to input the output of the challenge one way function to the challenge one way function until a valid challenge for the PUF is obtained;
   a translation module for translating the output of the challenge one way function into a valid challenge for the PUF; or
   a correction module for correcting the output of the challenge one way function into a valid challenge for the PUF.

4. The security component as claimed in claim 2, wherein the control logic further comprises:

a loopback register configured to be written with data based on a current response generated by the PUF; and wherein the challenge one way function is configured to generate a challenge for submission to the PUF based a current value of the input register and a current value of the loopback register.

5. The security component as claimed in claim 4, wherein the control logic further comprises:
a switch configured to control whether or not data based on a current response generated by the PUF is written to the loopback register.

6. The security component as claimed in claim 2, wherein the control logic further comprises:
an input one way function that is configured to generate an input for writing to the input register based on a current measurement of a component booted on the device, or a measurement of a hardware state of the device, and on a current value of the input register.

7. The security component as claimed in claim 2, wherein the input register is further configured to be written with data provided by a component booted on the device.

8. The security component as claimed in claim 1, wherein the control logic further comprises:
an output one way function that is configured to generate a security component output based on a response generated by the PUF; and
an output register configured to be written with the security component output.

9. The security component as claimed in claim 8, wherein the output one way function is further configured to generate the security component output based on both the response generated by the PUF and an identifier of a component requesting a response from the PUF.

10. The security component as claimed in claim 9, wherein the control logic further comprises:
an intermediate register configured to be written with a response of the PUF; and wherein the output one way function is configured to generate the security component output based on both a current value of the intermediate register and an identifier of a component requesting a response from the PUF.

11. A method for operating a security component for a device, the security component comprising a Physically Unclonable Function (PUF) that is operable to accept a plurality of challenges and to generate a corresponding plurality of responses, and control logic configured to generate a challenge for submission to the PUF, the method comprising:
receiving, from a device boot process, at least one of a measurement of a component booted on the device, or a measurement of a hardware state of the device;
using the control logic to generate a challenge for submission to the PUF on the basis of the received measurement;
generating a PUF response on the basis of the generated challenge; and
generating a security component output on the basis of the PUF response.

12. The method as claimed in claim 11, wherein using the control logic to generate a challenge for the PUF on the basis of the received measurement comprises:
inputting data based on at least the received measurement to a challenge one way function, wherein the challenge one way function is configured to generate the challenge for submission to the PUF.

13. The method as claimed in claim 12, wherein using the control logic to generate a challenge for the PUF on the basis of the received measurement further comprises:
inputting data based on a current response generated by the PUF to the challenge one way function.

14. The method as claimed in claim 13, wherein the step of inputting data based on a current response generated by the PUF to the challenge one way function is conditional upon a switch being in a first position.

15. The method as claimed in claim 12, wherein using the control logic to generate a challenge for the PUF on the basis of the received measurement further comprises:
inputting to an input one way function:
the received measurement; and
the preceding result of the input one way function;
wherein the input one way function is configured to generate the data based on at least the received measurement for input to the challenge one way function.

16. The method as claimed in claim 12, wherein using the control logic to generate a challenge for the PUF on the basis of the received measurement further comprises:
inputting data provided by a component booted on the device to the challenge one way function.

17. The method as claimed in claim 11, wherein using the control logic to generate a challenge for the PUF on the basis of the received measurement comprises:
determining whether or not an output from the challenge one way function is a valid challenge for the PUF; and
if the output from the challenge one way function is not a valid challenge for the PUF, converting the output of the challenge one way function into a valid challenge for the PUF by performing at least one of:
inputting the output of the challenge one way function to the challenge one way function until a valid challenge for the PUF is obtained;
translating the output of the challenge one way function into a valid challenge for the PUF; or
correcting the output of the challenge one way function into a valid challenge for the PUF.

18. The method as claimed in claim 11, wherein generating a security component output on the basis of the PUF response comprises:
inputting the PUF response to an output one way function, wherein the output one way function is configured to generate the security component output.

19. The method as claimed in claim 18, wherein generating a security component output on the basis of the PUF response further comprises:
inputting both the PUF response and an identifier of a component requesting a response from the PUF to the output one way function.

* * * * *